(12) United States Patent
Matsumiya et al.

(10) Patent No.: US 8,460,100 B2
(45) Date of Patent: Jun. 11, 2013

(54) GAME APPARATUS, GAME PROGRAM AND GAME SYSTEM

(75) Inventors: Nobuo Matsumiya, Kyoto (JP); Emi Watanabe, Kyoto (JP); Yuhei Matsuda, Tokyo (JP); Hironori Kuraoka, Tokyo (JP)

(73) Assignee: Nintendo Co. Ltd., Kyoto (JP)

( * ) Notice: Subject to any disclaimer, the term of this patent is extended or adjusted under 35 U.S.C. 154(b) by 148 days.

(21) Appl. No.: 12/858,870

(22) Filed: Aug. 18, 2010

(65) Prior Publication Data

US 2011/0300936 A1 Dec. 8, 2011

(30) Foreign Application Priority Data

Jun. 7, 2010 (JP) ................................. 2010-130199

(51) Int. Cl.
*A63F 13/00* (2006.01)
(52) U.S. Cl.
USPC ................... 463/32; 463/31; 463/33; 463/42; 345/418; 345/462; 345/473; 345/640
(58) Field of Classification Search
USPC .................. 463/31, 32, 33, 42; 345/418, 462, 345/473, 640
See application file for complete search history.

(56) References Cited

U.S. PATENT DOCUMENTS

| | | | |
|---|---|---|---|
| 6,897,865 B2 * | 5/2005 | Higashiyama ................. | 345/426 |
| 7,091,972 B2 * | 8/2006 | Iwanaga ........................ | 345/426 |
| 7,636,087 B2 * | 12/2009 | Takahashi et al. ............. | 345/418 |
| 7,737,857 B2 * | 6/2010 | Ebert et al. ................... | 340/572.4 |
| 7,880,726 B2 * | 2/2011 | Nakadaira et al. ............. | 345/173 |
| 7,931,535 B2 * | 4/2011 | Ikeda et al. ................... | 463/38 |
| 7,995,032 B2 * | 8/2011 | Morimoto et al. ............. | 345/157 |
| 8,012,018 B2 * | 9/2011 | Kawade et al. ................ | 463/32 |
| 8,043,161 B2 * | 10/2011 | Nogami et al. ................ | 463/43 |
| 8,050,535 B2 * | 11/2011 | Sato et al. ..................... | 386/248 |
| 8,105,142 B2 * | 1/2012 | Ishihata et al. ................ | 463/1 |
| 8,120,574 B2 * | 2/2012 | Kaneshige et al. ............ | 345/156 |

OTHER PUBLICATIONS

Namco Bandai Games Inc., "Pac-Pix" URL:http://www.bandainamcogames.co.jp/cs/list/pac-pix/index.php, Mar. 2005, 2 pages.

* cited by examiner

*Primary Examiner* — Pierre Eddy Elisca
*Assistant Examiner* — Shahid Kamal
(74) *Attorney, Agent, or Firm* — Nixon & Vanderhye, P.C.

(57) ABSTRACT

A game apparatus generates control point data for forming a contour of each part of a character, generates a line model of a body being a line polygon model along the body on the basis of the control point data, then generates a line model of a foot being a line polygon model along a contour of one foot, and arranged at the back of the line model of the body Bd in a Z direction, and generates a mask model of the body being a transparent polygon model arranged at the back of the line model of the body in the Z direction and in front of the line model of the foot in the Z direction, and having the contour along the line of the body. Then, when the respective models are depicted with a Z comparison performed after depicting a background, the mask model of the body, the line model of the foot, the line model of the body are depicted in this order.

14 Claims, 23 Drawing Sheets

FIG. 3
(A)
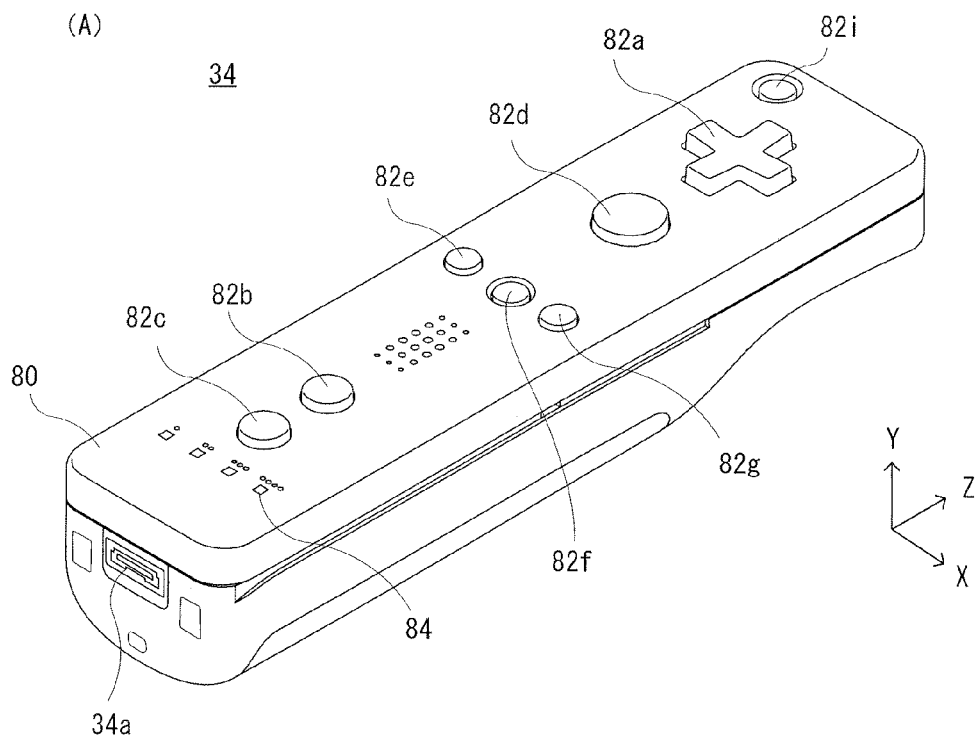
(B)
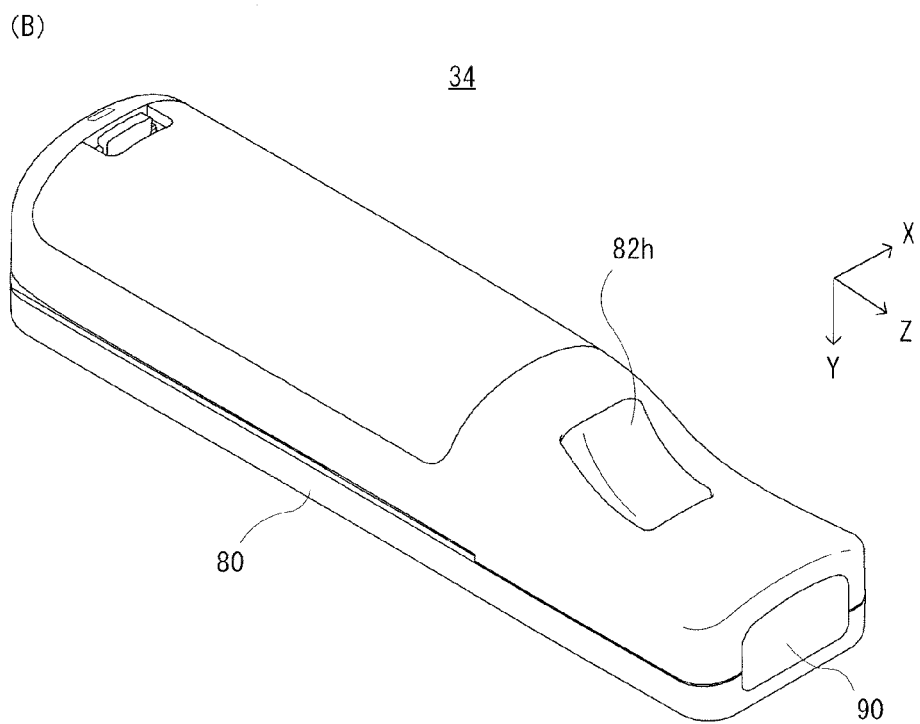

FIG. 4
(A)
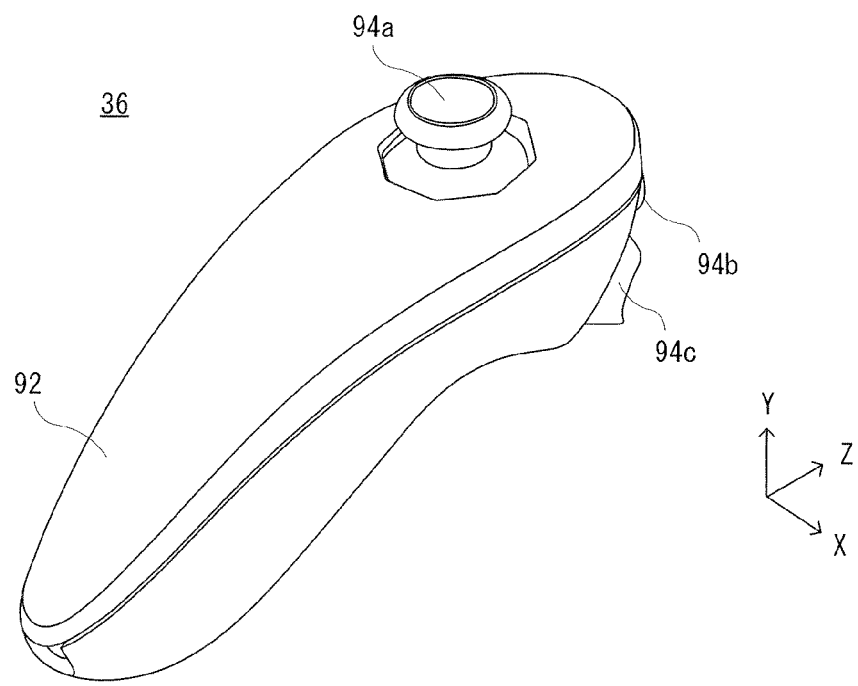
(B)
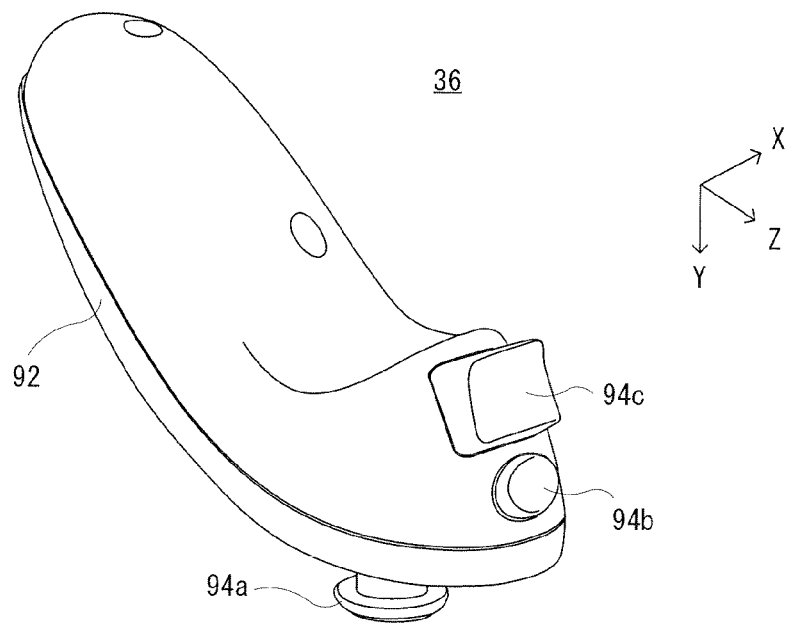

FIG. 10
(A) CONTROL POINTS FOR FORMING CONTOUR OF CHARACTER
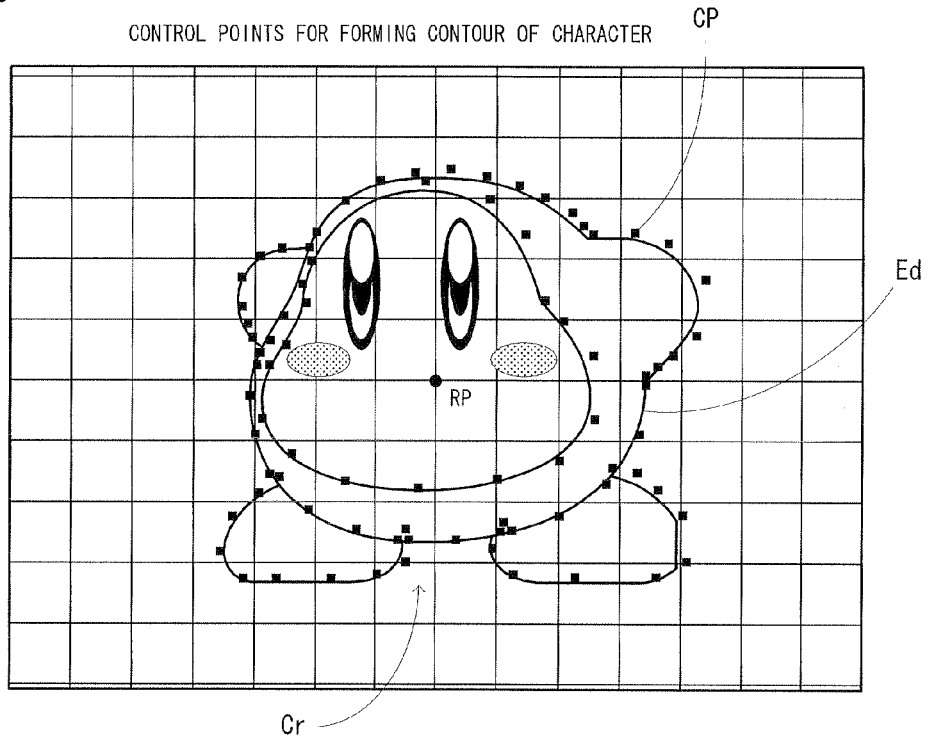
(B) GENERATE LINE MODEL FROM CONTROL POINTS
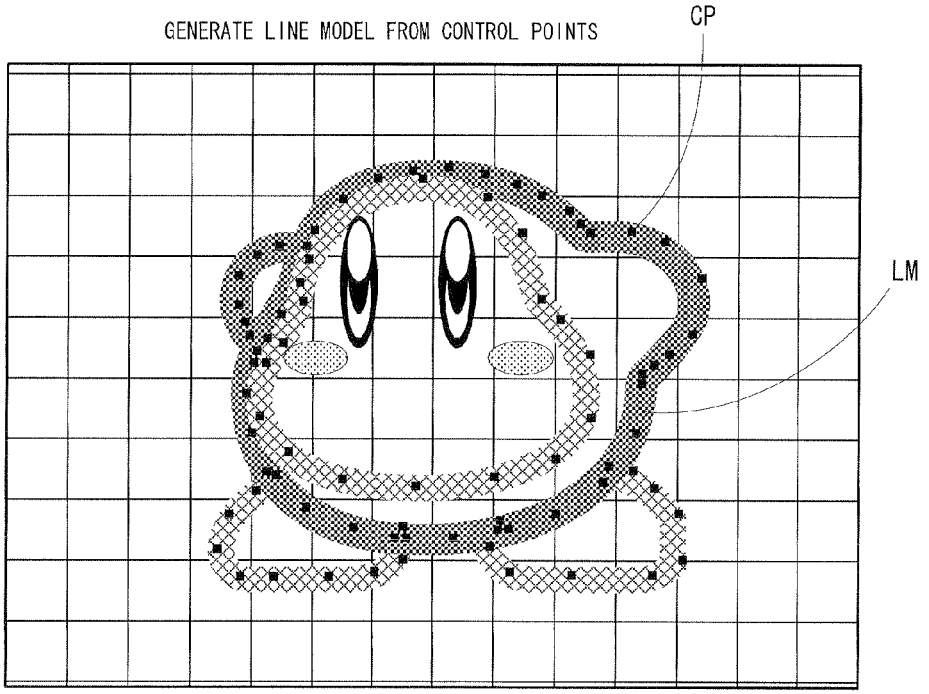

FIG. 11 (A)
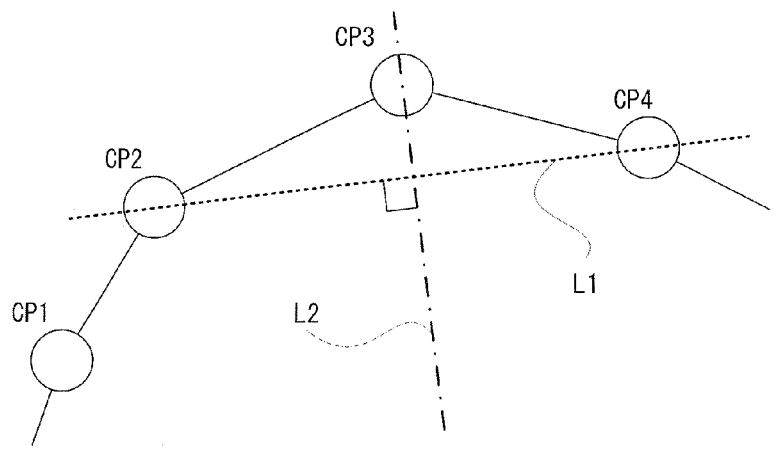
(B)
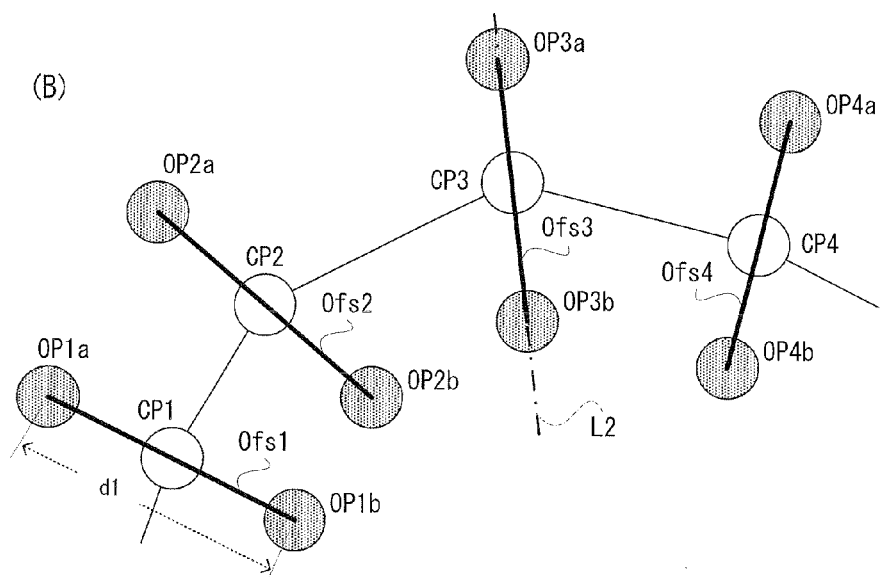
(C)
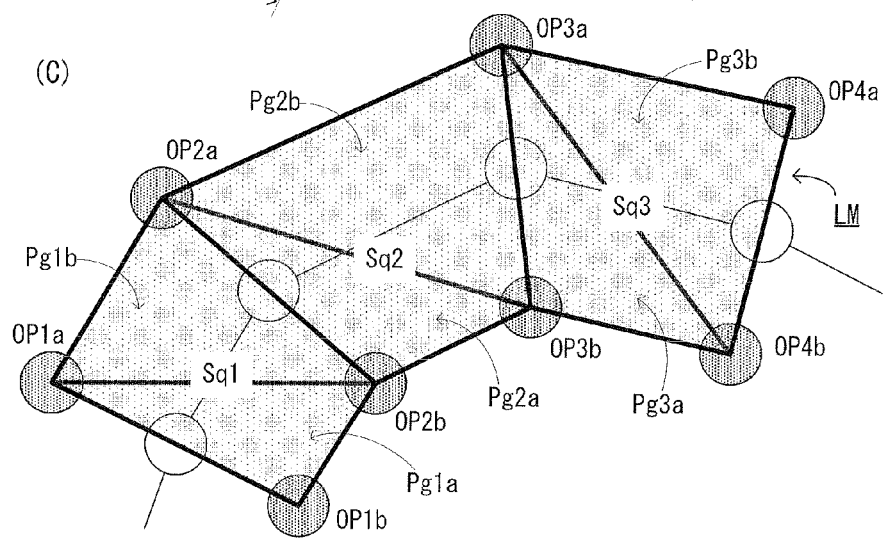

FIG. 12
(A)
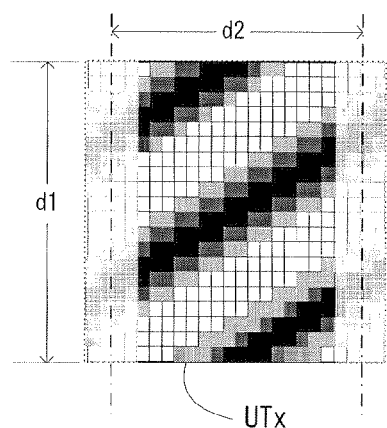
(B)
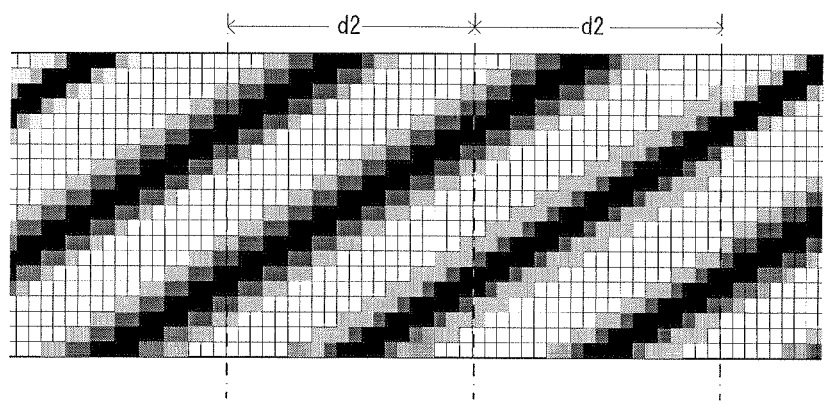

FIG. 13
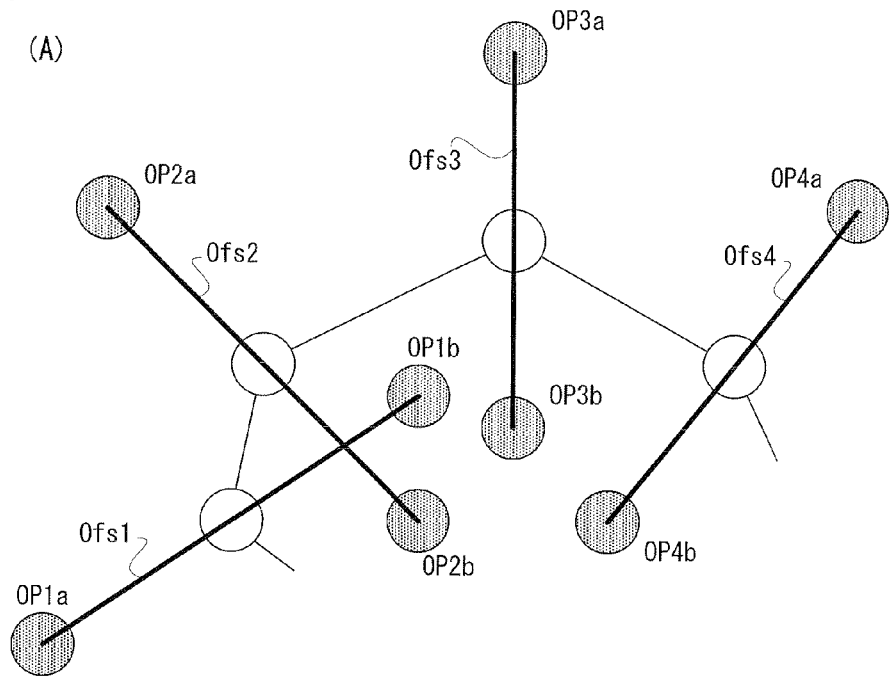
(A)
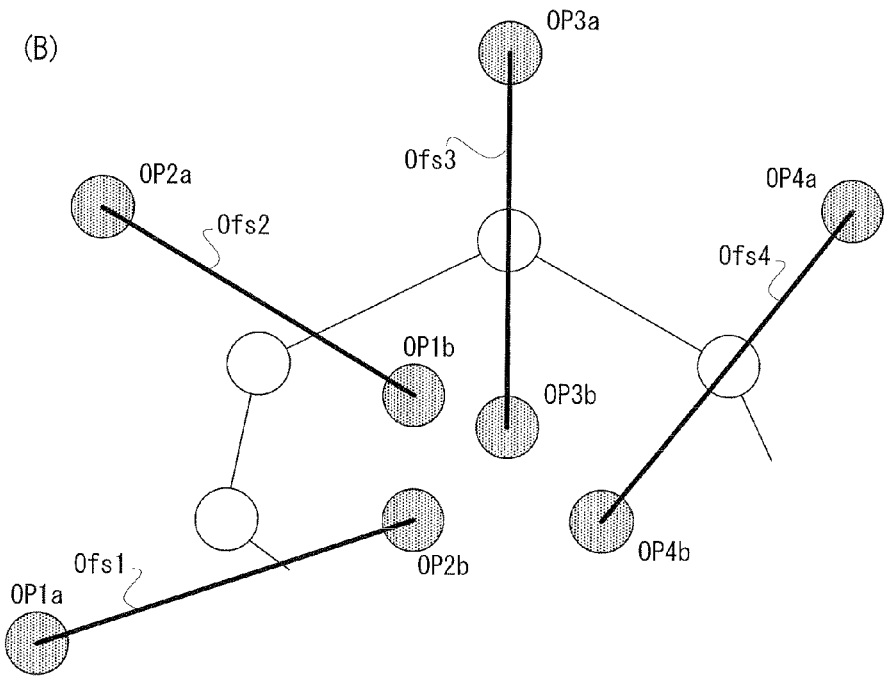
(B)

FIG. 14
(A) LINE MODEL TO WHICH OVERWRITE OCCURS
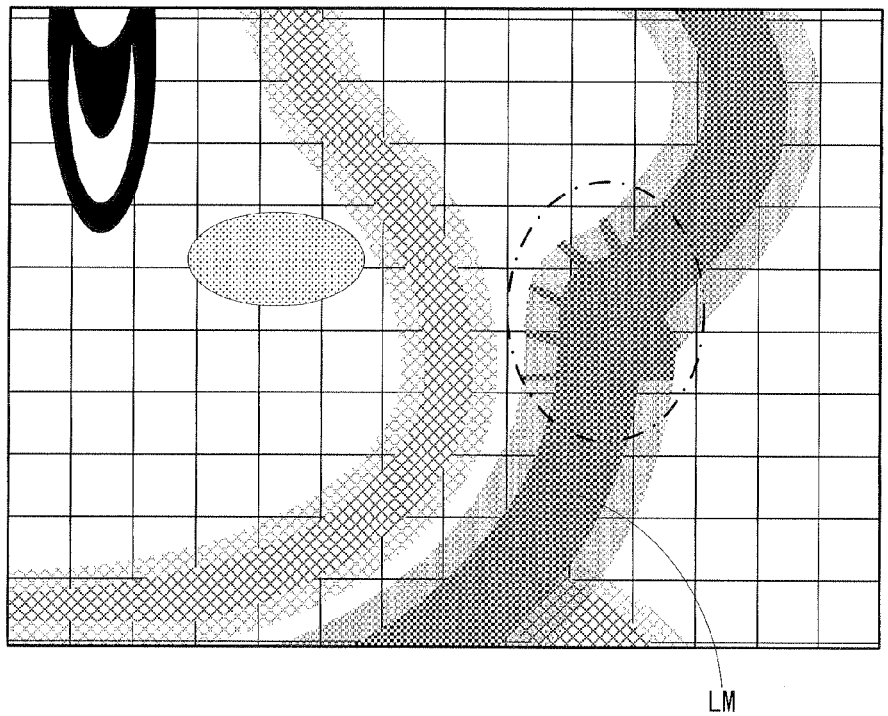
LM
(B) LINE MODEL IN WHICH OVERWRITING IS CORRECTED

FIG. 16
(A)
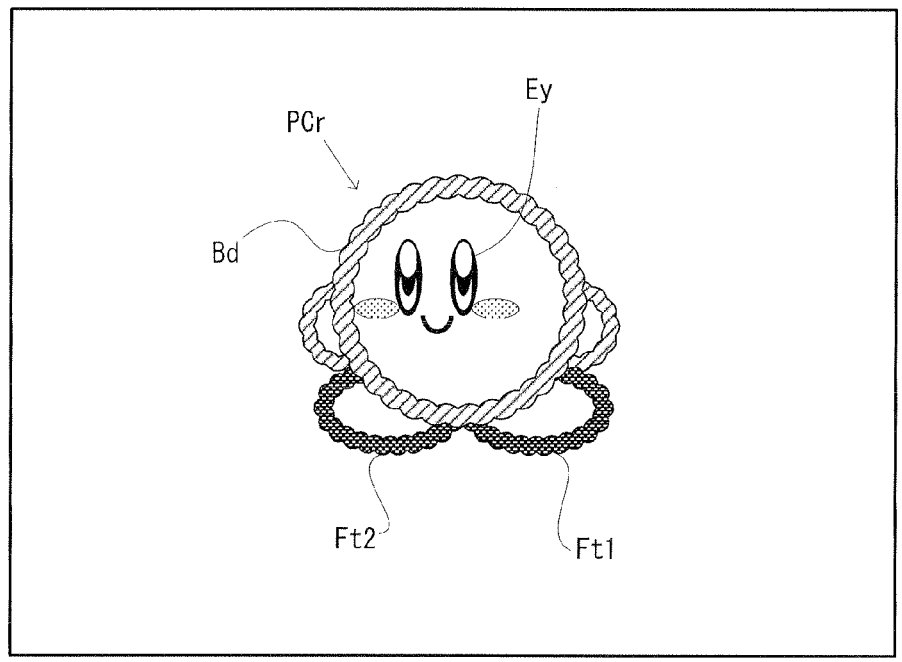
(B) "WALKING" ANIMATION
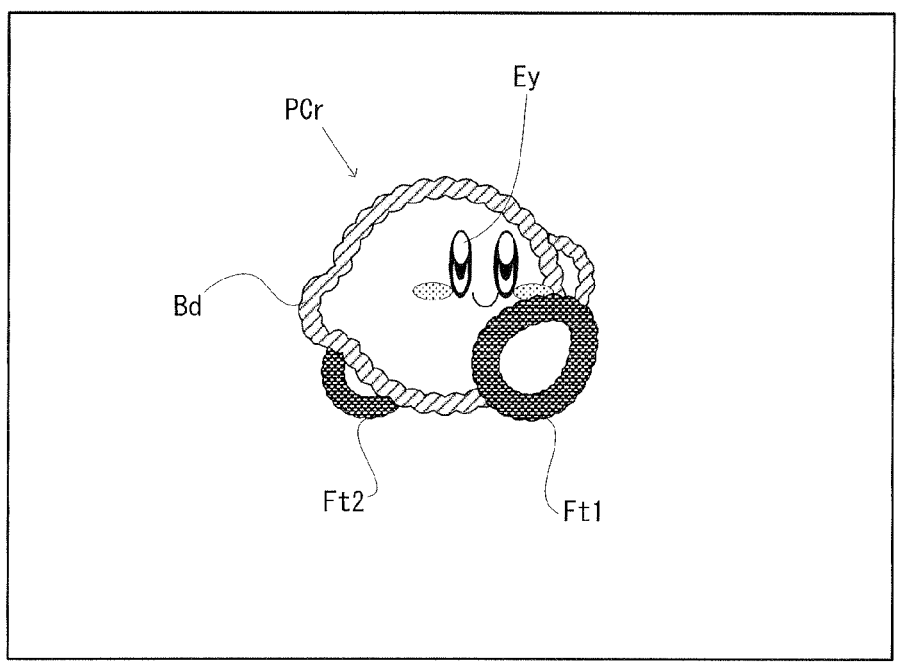

FIG. 17
(A) "JUMPING" ANIMATION
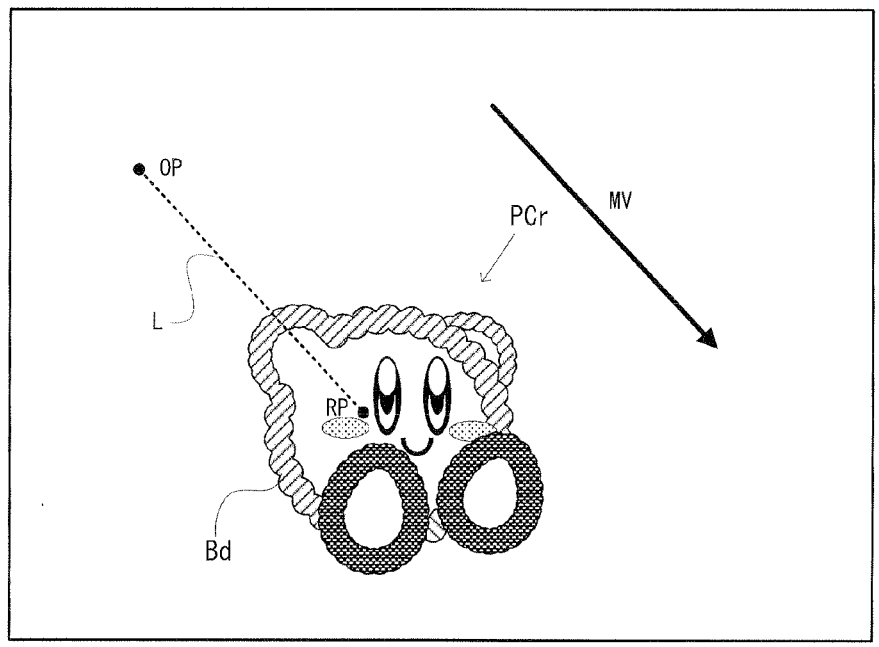
(B) OFFSET IN CORRESPONDENCE WITH MOVING STATE
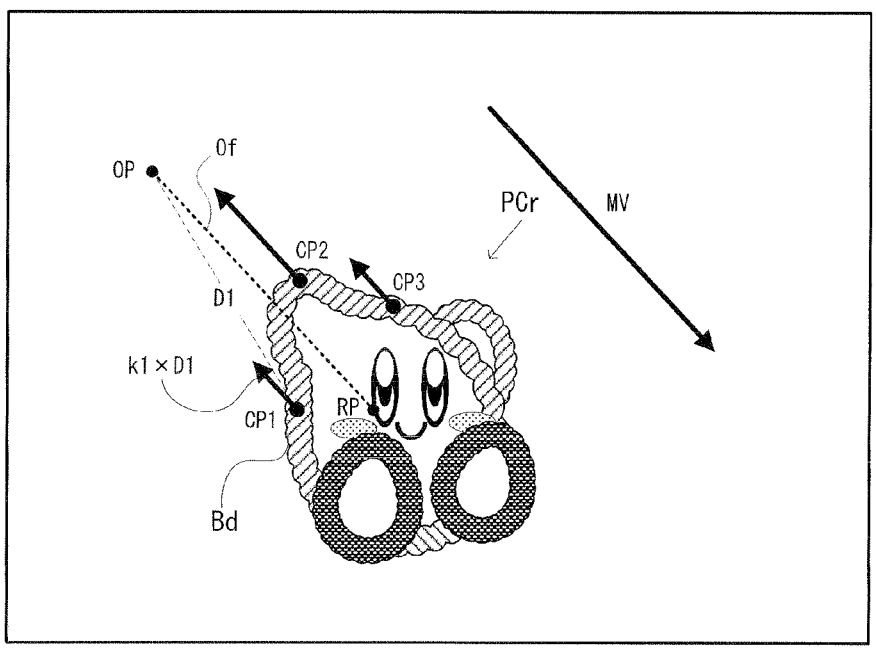

FIG. 18
(A)
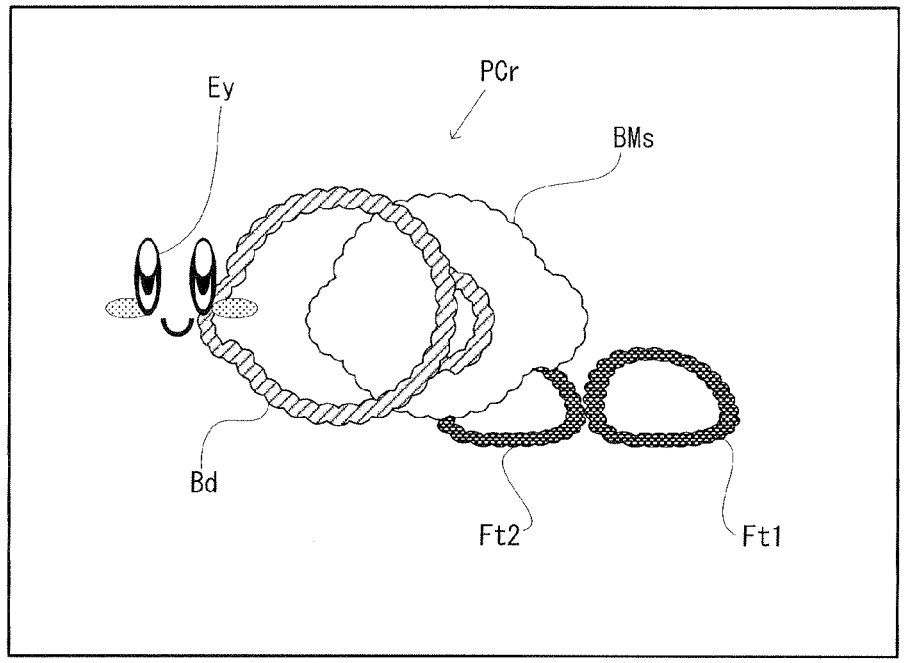
(B)
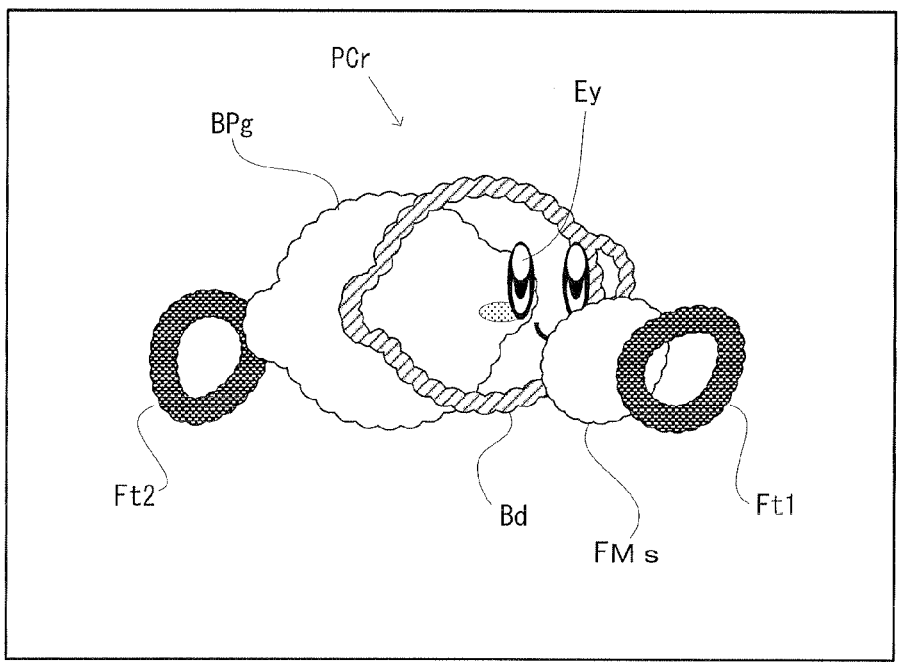

FIG. 20

(A)  Z DATA FOR DEPICTING    76f (INNERMOST) LINE OF FOOT→MASK OF BODY→LINE OF BODY→EYES→ (FOREMOST)

(B)  Z DATA FOR SORTING    76g (INNERMOST) MASK OF BODY→LINE OF FOOT→LINE OF BODY→EYES (FOREMOST)

FIG. 21

(A)  Z DATA FOR DEPICTING    76f (INNERMOST) LINE OF FOOT AT BACK→MASK OF BODY→LINE OF BODY→EYES→MASK OF FOOT AT FRONT→LINE OF FOOT AT FRONT (FOREMOST)

(B)  Z DATA FOR SORTING    76g (INNERMOST) MASK OF BODY→MASK OF FOOT AT FRONT→LINE OF FOOT AT BACK→LINE OF BODY→EYES→LINE OF FOOT AT FRONT (FOREMOST)

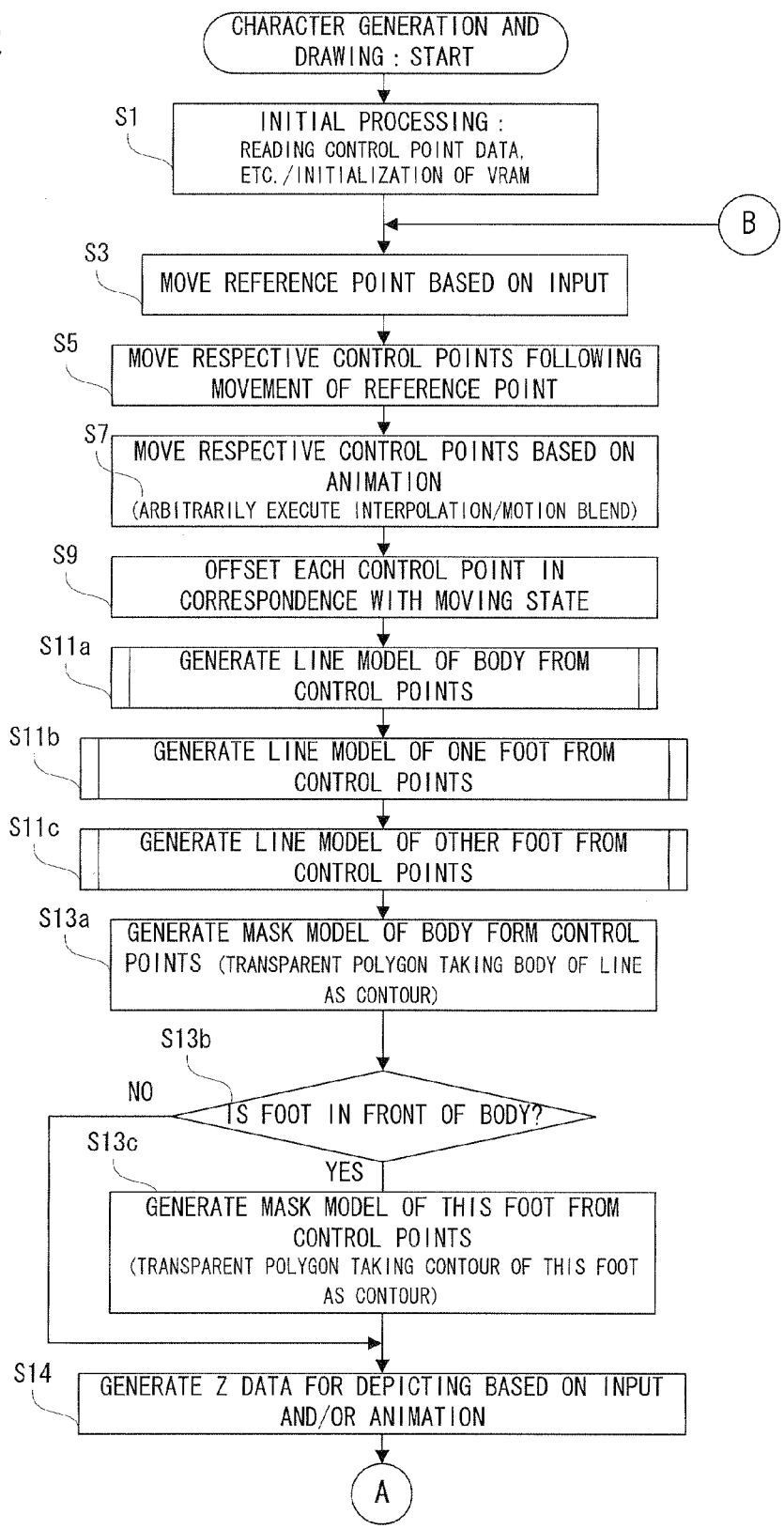

(B) Z DATA FOR DEPICTING    76f (INNERMOST) LINE OF ENEMY→LINE OF FOOT→ MASK OF BODY→LINE OF BODY→EYES (FOREMOST)

(C) Z DATA FOR SORTING    76g (INNERMOST) LINE OF ENEMY→MASK OF BODY→LINE OF FOOT→LINE OF BODY→EYES (FOREMOST)

GAME APPARATUS, GAME PROGRAM AND GAME SYSTEM

CROSS REFERENCE OF RELATED APPLICATION

The disclosure of Japanese Patent Application No. 2010-130199 is incorporated herein by reference.

BACKGROUND OF THE INVENTION

1. Field of the invention

The present invention relates to a game apparatus, a game program and a game system. More specifically, the present invention relates to a game apparatus, a game program and a game system which represents an object by a contour.

2. Description of the related art

Conventionally, as an image processing apparatus of this kind, one disclosed in a non-patent document is known. In the related art, when a player depicts a picture on a touch screen with a pen, the picture starts to move within the screen.
(Non-Patent Document 1)
NAMCO BANDAI Games Inc., "Pac-Pix" (registered trademark), [online], [searched on May 25, 2010], the Internet <URL:http://www.bandainamcogames.co.jp/cs/list/pac-pix/index.php>

In the aforementioned related art, the picture moving within the screen is a simple graphic like a "Pac-Man" (registered trademark) (line drawing with few lines), through the graphic (part encircled with the line forming the graphic), a background at the back thereof is visible, and only simple movements, such as moving and changing directions can be represented.

Hereupon, it is conceivable that a character having the body and the feet is caused to appear in the screen, for example, and caused to move the body independent of the feet to thereby represent a complex movement, such as "walking". In addition, it is also conceivable that the feet is made invisible through the body (part encircled with a line forming it) with the feet at the back of the body (shows as if the feet are at the back of the body), whereby not a representation as a mere line but a representation true-to a contour can be made.

However, in the related art, handwriting is made on the touch screen, and therefore, it is difficult to generate a complex character. Furthermore, assuming that a character having the body and the feet can be generated, it is difficult to move the feet independent of the body. In addition, assuming that the feet are made invisible through the body with the feet at the back of the body, the background is also made invisible through the body, resulting in a loss of the feature of the line drawing such as transparency of the background.

On the other hand, when the transparency of the background is given priority, the feet is made visible through the body, but this may be a factor of making the player have uncomfortable feeling especially when an existing character is represented by a line drawing.

SUMMARY OF THE INVENTION

Therefore, it is a primary object of the present invention to provide a novel game apparatus, a game program and a game system.

Another object of the present invention is to provide a game apparatus, a game program, and a game system capable of generating a character object having a complex line shape and making variable movements without losing the feature of a line drawing, such as transparency of the background and without uncomfortable feeling.

The present invention adopts features described below in order to solve the aforementioned problems.

A first invention is a game apparatus displaying a character object within a three-dimensional virtual space, comprising: a contour information generator which generates contour information for forming a contour of each part of the character object; a first line model generator which generates a first line model being a line polygon model along a contour of a first part of the character object on the basis of the contour information; a second line model generator which generates a second line model being a line polygon model along a contour of a second part of the character object, and arranged at a back of the first line model in a Z direction on the basis of the contour information; a first mask model generator which generates a first mask model being a transparent polygon model that is arranged at the back of the first line model in the Z direction and in front of the second line model in the Z direction, and having the contour along the first part on the basis of the contour information; a background depicter which depicts a background; and a model depicting processor which depicts the respective models with a Z comparison performed after depicting by the background depicter, wherein the model depicting processor first depicts the first mask model, depicts the second line model after the first mask model, and depicts the first line model after the second line model.

In the first invention, a contour information generator generates contour information for forming a contour of each part of the character object. Here, the contour information preferably includes coordinate information of each point along the contour as in a third invention described later, but in place of the coordinate information, information indicating the line itself along the contour may be included.

On the basis of the contour information, a first line model generator generates a first line model being a line polygon model along a contour of a first part of the character object, a second line model generator generates a second line model being a line polygon model along a contour of a second part of the character object, and arranged at a back of the first line model in a Z direction, and a first mask model generator generates a first mask model being a transparent polygon model that is arranged at the back of the first line model in the Z direction and in front of the second line model in the Z direction, and having the contour along the first part.

After depicting a background by a background depicter, the respective models thus generated are depicted by a model depicting processor with a Z comparison performed from firstly the first mask model, the second line model, and the first line model, in this order.

According to the first invention, the contour information is generated, and on the basis of this, the line polygon model along the contour of each part of the character object is generated, and therefore, it is possible to generate a character object having a complex line shape and making various movements through the contour information.

Furthermore, the first mask model is first depicted after depicting the background when such a character object is depicted, and whereby, both of the first line model and the second line model undergo the Z comparison with the first mask model. The first line model is in front of the first mask model in the Z direction, and thus depicted without undergoing the mask by the first mask model. On the other hand, the second line model is at the back of the first mask model in the Z direction, and thus masked at a part overlapped with the first mask model, and depicted only at a part not overlapped with the first mask model. Furthermore, the first mask model is transparent, and has no effect on visibility of the background. Accordingly, through the inside of the first line model (part encircled by the first line model), the background is visible, but the second line model is made invisible. Thus, it is possible to depict the character object without losing the feature of the line drawing, such as transparency of the background and without uncomfortable feeling.

Here, in a case that another object arranged at the back of the character object in the Z direction is further depicted in addition to the character object, by depicting this another object in front of the first mask model, this another object is visible through the inside of the first line model.

A second invention is a game apparatus according to the first invention, further comprising: a third line model generator which generates a third line model being a line polygon model along a contour of a third part of the character object, and being arranged in front of the first line model in the Z direction on the basis of the contour information, and a second mask model generator which generates a second mask model being a transparent polygon model that is arranged in front of the first line model in the Z direction and at a back of the third line model in the Z direction, and having the contour along the third part on the basis of the contour information, wherein the model depicting processor further depicts the second mask model after the first mask model and before the second line model, and depicts the third line model after the first line model.

In the second invention, on the basis of the contour information, a third line model generator generates a third line model being a line polygon model along a contour of a third part of the character object, and being arranged in front of the first line model in the Z direction, and a second mask model generator generates a second mask model being a transparent polygon model that is arranged in front of the first line model in the Z direction and at a back of the third line model in the Z direction, and having the contour along the third part. A model depicting processor further depicts the second mask model after the first mask model and before the second line model, and depicts the third line model after the first line model.

According to the second invention, after depicting the background, the first mask model is first depicted, and then the second mask model is next depicted, and whereby, the first line model, the second line model and the third line model undergo a Z comparison with the first mask model and moreover the second mask model. Here, when the second mask model is depicted before the first mask model, a loss may be occur in the first mask model due to the Z comparison, and this is not preferable.

The first line model is arranged in front of the first mask model in the Z direction, and thus, it doe not undergo the mask by the first mask model, but the first line model is arranged at the back of the second mask model in the Z direction, and thus, it is masked at a part overlapped with the second mask model and depicted only at a part not overlapped with the second mask model. The second line model are at the back of both of the first mask model and the second mask model in the Z direction, and thus, it is masked at a part overlapped with the first mask model and/or the second mask model, and depicted at a part not overlapped with both of the first mask model and the second mask model. The third line model is in front of both of the first mask model and the second mask model in the Z direction, and thus it is depicted without undergoing any mask by the first mask model and the second mask model. In addition, since the second mask model is transparent similar to the first mask model, it has no effect on visibility of the background.

Accordingly, through the inside of the first line model and/or the third line model (part encircled by the first line model and/or the third line model), the background is visible, but the second line model is invisible.

A third invention is a game apparatus according to the first or the second invention, wherein the contour information includes coordinate information of respective points along the contour.

In the third invention, the contour of each part is formed on the basis of coordinate information of respective points along this.

According to the third invention, by controlling the coordinates of the respective points along the contour, various contours can be efficiently generated.

A fourth invention is a game apparatus according to the third invention, and further comprising: an acceptor which accepts an input from an operating device; and a game processor which repetitively executes game processing including an animation control with respect to the character object in response to the input accepted by the acceptor and/or on the basis of a predetermined algorithm, wherein the contour information generator generates the coordinate information in association with the execution of the game processing.

In the fourth invention, in response to the input from the operating device and/or on the basis of a predetermined algorithm, game processing including an animation control with respect to the character object is executed. The coordinate information of each contour is generated in association with execution of such the game processing.

According to the fourth invention, it is possible to generate a contour which dynamically changes according to the animation control. As a result, it is possible to represent more complex motions.

A fifth invention is a game apparatus according to the fourth invention, wherein the contour information generator offsets the coordinate information in correspondence with a moving state of the character object by the animation control.

According to the fifth invention, by offsetting the coordinate information in correspondence with the moving state by the animation control, a change depending on the moving state can be given to the character object. In a case that a "jumping" animation is added to the character object, it is possible to cause deformation as if the player character is pulled in a direction reverse to the direction of travel by an air resistance.

A sixth invention is a game apparatus according to the fifth invention, wherein the contour information further includes parameter information indicating a degree of offset in correspondence with the moving state of each point along the contour, and the contour information generator changes an amount of offset of each point on the basis of the parameter information.

In the sixth invention, by changing an amount of offset of each point through the parameter information, it is possible to partially control the degree of deformation. In a case that a "jumping" animation is added to the character object, the parietal region is largely offset and the cheeks and the back are small offset, and whereby, it is possible to cause natural deformation as if the player character is pulled in a direction reverse to the direction of travel by an air resistance.

A seventh invention is a game apparatus according to any one of the third to fifth inventions, wherein each line model generator generates a line polygon model with a predetermined width along the contour of each part on the basis of the coordinate information.

In the seventh invention, a line polygon model with a predetermined width along the contour of each part is generated on the basis of the coordinate information.

An eighth invention is a game apparatus according to the seventh invention, wherein each line model generator evaluates a normal vector with respect to the contour in each point, assign to each point a line segment in parallel with the normal vector in the point and having the predetermined width, and generates a series of polygons each having a pair of endpoints of each line segment as shared vertexes.

In the eighth invention, a normal line is evaluated for each point, each normal line is assigned a line segment with a predetermined width and being in parallel therewith, and a series of polygons each having a pair of endpoints of each line segment as shared vertexes (connected via each line segment) are generated.

According to the seventh and eighth inventions, it is easily obtain a line polygon model with a predetermined width along the contour.

A ninth invention is a game apparatus according to the eighth invention, wherein the model depicting processor repetitively maps a unit texture by dividing the series of polygons on a predetermined number basis (two, for example) when each of the line models is depicted.

A tenth invention is a game apparatus according to the ninth invention, wherein the unit texture is repetitively mapped to form a knitting pattern.

According to the ninth and tenth inventions, it is possible to efficiently map a texture obtained by repeating the same patterns like knitting on each line model.

An eleventh invention is a game apparatus according to any one of the first to tenth inventions, further comprising: a Z-array information generator which generates Z-array information indicating an alignment of the respective line models, and a Z-sorting information generator which generates Z-sorting information indicating a depicting order of the respective line models, wherein the model depicting processor depicts each line segment in an order according to the Z-sorting information with a Z comparison based on the Z-array information performed.

According to the eleventh invention, it is possible to dynamically make a depicting control of the respective line models through the Z-array information and the Z-sorting information.

A twelfth invention is a storage medium storing a game program, the game program causes a computer of a game apparatus displaying a character object within a three-dimensional virtual space to function as: a contour information generator which generates contour information for forming a contour of each part of the character object; a first line model generator which generates a first line model being a line polygon model along a contour of a first part of the character object on the basis of the contour information; a second line model generator which generates a second line model being a line polygon model along a contour of a second part of the character object and arranged at a back of the first line model in a Z direction on the basis of the contour information; a first mask model generator which generates a first mask model being a transparent polygon model that is arranged at the back of the first line model in the Z direction and in front of the second line model in the Z direction, and having the contour along the first part on the basis of the contour information; a background depicter which depicts a background; and a model depicting processor which depicts the respective models with a Z comparison performed after depicting by the background depicter, wherein the model depicting processor first depicts the first mask model, depicts the second line model after the first mask model, and depicts the first line model after the second line model.

A thirteenth invention is a game system displaying a character object within a three-dimensional virtual space, comprising: a contour information generator which generates contour information for forming a contour of each part of the character object; a first line model generator which generates a first line model being a line polygon model along a contour of a first part of the character object on the basis of the contour information; a second line model generator which generates a second line model being a line polygon model along a contour of a second part of the character object, and arranged at a back of the first line model in a Z direction on the basis of the contour information; a first mask model generator which generates a first mask model being a transparent polygon model that is arranged at the back of the first line model in the Z direction and in front of the second line model in the Z direction, and having the contour along the first part on the basis of the contour information; a background depicter which depicts a background; and a model depicting processor which depicts of the respective models with a Z comparison performed after depicting by the background depicter, wherein the model depicting processor first depicts the first mask model, depicts the second line model after the first mask model, and depicts the first line model after the second line model.

In each of the twelfth and thirteenth inventions as well, similar to the first invention, it is possible to generate a character object having a complex line shape and making various movements through the contour information. Furthermore, it is possible to depict the character object thus generated without losing the feature of the line drawing, such as transparency of the background and without uncomfortable feeling.

A fourteenth invention is game apparatus displaying a character object within a three-dimensional virtual space, comprising: a contour information generator which generates contour information for forming a contour of each part of the character object; a line model generator which generates each line model being a line polygon model along a contour of each part of the character object on the basis of the contour information; a mask model generator which generates a mask model being a transparent polygon model having, with respect to at least one part of the character object, a contour along the part on the basis of the contour information; a Z-array information generator which generates Z-array information indicating an alignment in a Z direction of the respective line models; a Z-sorting information generator which generates Z-sorting information indicating a depicting order of the respective line models; a background depicter which depicts a background; and a model depicting processor which depicts the respective models in the order according to the Z-sorting information with a Z comparison based on the Z-sorting information performed after depicting by the background depicter, wherein the Z-sorting information generator generates such Z-sorting information to cause said model depicting processor to depict each of the mask models before a line model to be masked in the order according to the Z-array information out of the respective line models; and generate Z-sorting information for depicting each of the line models in the order according to the Z-array information after each of the mask models.

Here, the line model which is no to be masked may be depicted before each mask model.

In the fourteenth invention, a contour information generator generates contour information for forming a contour of each part of the character object. On the basis of the contour information, a line model generator generates each line model being a line polygon model along a contour of each part of the character object, and a mask model generator generates a mask model being a transparent polygon model having, with respect to at least one part of the character object, a contour along the part. Additionally, a Z-array information generator generates Z-array information indicating an alignment in a Z direction of each of the respective models, and a Z-sorting information generator generates Z-sorting information indicating a depicting order of the respective line models.

Each model thus generated is depicted in the order according to the Z-sorting information with a Z comparison based on the Z-sorting information performed by model depicting processor after depicting by the background depicter. The Z-sorting information describes that each of the mask models is depicted before a line model to be masked in the order according to the Z-array information out of the respective line models, and each of the line models is depicted in the order after each of the mask models according to the Z-array information.

According to the fourteenth invention, the contour information is generated, and on the basis of this, the line polygon model along the contour of each part of the character object is generated, and therefore, it is possible to generate a character object having a complex line shape and making various movements through the contour information.

Furthermore, when such a character object is depicted, by depicting each mask model faster than the line model to be masked out of the respective line models after depicting of the background, all the line models to be masked undergo a Z comparison with each mask model. The depicting order among the mask models is according to the Z-array information, and therefore, no loss occurs to any mask models. The line model in front of each mask model in the Z direction is depicted without undergoing masks by any mask models. On the other hand, the line model at the back of each mask model in the Z direction is masked at a part overlapped with at least one mask model, and depicted at a part not overlapped with any mask model. Then, each mask model is transparent and thus has no effect on visibility of the background. Accordingly, through the inside of each line model (part encircled by each line model), the background is made visible, but each line at the back of the line model in the Z direction is invisible. It is possible to depict the character object without losing the feature of the line drawing, such as transparency of the background and without uncomfortable feeling.

According to the present invention, it is possible to implement a game apparatus and a game program capable of generating a character object having a complex line shape and making various movements, and depict the character object without losing the feature of the line drawing, such as transparency of the background and without uncomfortable feeling.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing an appearance of a first controller;

FIG. 4 is an illustrative view showing an appearance of a second controller;

FIG. 10 is an illustrative view explaining an outline of character depicting processing, FIG. 10(A) shows processing of defining control points, and FIG. 10(B) shows processing of generating a line model from the control points;

FIG. 11 is an illustrative view showing a detail of processing of generating a line model from control points, FIG. 11(A) shows processing of evaluating a normal vector of each control point, FIG. 11(B) shows processing of assigning a pair of offset points to each control point, and FIG. 11(C) shows processing of generating a polygon connecting the offset points;

FIG. 12 is an illustrative view showing a texture to be pasted on the polygon, FIG. 12(A) shows a unit texture, and FIG. 12(B) shows a periodic texture based on the unit texture;

FIG. 13 is an illustrative view showing a correction of overwriting by changing in connection between the offset points, FIG. 13(A) shows offset points before a change in connection, and FIG. 13(B) shows offset points after a change in connection;

FIG. 14 is an illustrative view showing an advantage of the correction in FIG. 13, FIG. 14(A) shows one example of a line model before correction, and FIG. 14(B) shows one example of a corrected line model;

FIG. 16 is an illustrative view showing an example of depicting a player character, FIG. 16(A) shows a stopped state, and FIG. 16(B) shows a moving state according to a "walking" animation;

FIG. 17 is an illustrative view showing an another example of depicting the player character, FIG. 17(A) shows a moving state according to a "jumping" animation (no offset), and FIG. 17(B) shows an offset occurring in a moving state (deformation) in FIG. 17(A);

FIG. 18 is an illustrative view showing a Z position of respective elements making up of the player character, FIG. 18(A) corresponds to the stopped state in FIG. 16(A), and FIG. 18(B) corresponds to the "walking" state in FIG. 16(B);

FIG. 20 is an illustrative view showing one example of the Z data corresponding to FIG. 18(A), FIG. 20(A) shows Z data for depicting, and FIG. 20(B) shows Z data for sorting;

FIG. 21 is an illustrative view showing another example of Z data corresponding to FIG. 18(B), and FIG. 21(A) shows Z data for depicting, and FIG. 21(B) shows Z data for sorting;

FIG. 22 is a flowchart showing a part of an operation by a CPU;

DETAILED DESCRIPTION OF THE PREFERRED EMBODIMENTS

Figure 1:
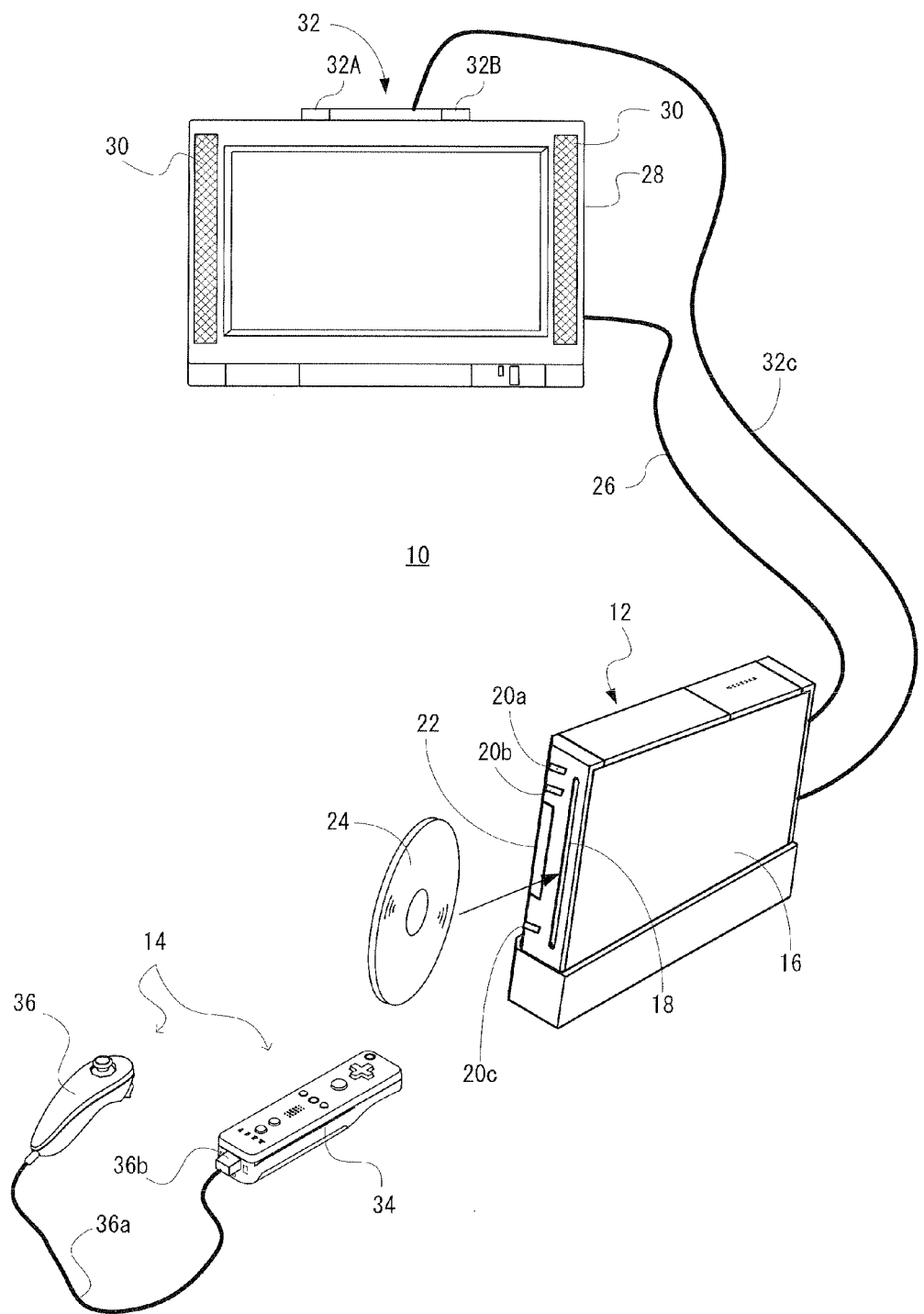
FIG. 1 is an illustrative view showing one embodiment of a game system of the present invention.

Referring to FIG. 1, a game system 10 of one embodiment of the present invention includes a game apparatus 12 and a controller 14. Although illustration is omitted, the game apparatus 12 of this embodiment is designed such that it can be connected to four controllers 14 at the maximum. Furthermore, the game apparatus 12 and each of the controllers 14 are wirelessly connected. For example, the wireless communication is executed according to an MP (Multilink Protocol) or Bluetooth (registered trademark) standard, but may be executed by other standards such as infrared rays, a wireless LAN, etc. Alternatively, they may be connected by wire.

The game apparatus 12 includes a roughly rectangular parallelepiped housing 16, and the housing 16 is furnished with a disk slot 18 on a front surface. An optical disk 24 as one example of an information storage medium storing a game program, etc. is inserted from the disk slot 18 to be loaded into a disk drive 54 (see FIG. 2) within the housing 16. Although omitted in the illustration, around the disk slot 18, an LED and a light guide plate are arranged so as to make the disk slot 18 light up and off or flash in response to various processing.

Furthermore, on a front surface of the housing 16 of the game apparatus 12, a power button 20a and a reset button 20b are provided at the upper part thereof, and an eject button 20c is provided below them. In addition, a connector cover for external memory card 38 is provided between the reset button 20b and the eject button 20c, and in the vicinity of the disk slot 18. Inside the connector cover for external memory card 22, a connector for external memory card 62 (see FIG. 2) is provided, through which an external memory card (hereinafter simply referred to as a "memory card 38") not shown is inserted. The memory card is employed for loading the game program, etc. read from the optical disk 24 to temporarily store it, storing (saving) game data (result data, proceeding data of the game, or replay data described later) of the game played by means of the game system 10, and so forth. Here, storing the game data described above may be performed on an internal memory, such as a flash memory 44 (see FIG. 2) provided inside the game apparatus 12 in place of the memory card 38. Also, the memory card 38 may be utilized as a backup memory of the internal memory. In addition, in the game apparatus 12, an application other than the game can be executed, and in such a case, data of the other application can be saved in the memory card 38.

It should be noted that a general-purpose SD card can be employed as a memory card 38, but other general-purpose memory cards, such as memory sticks, multimedia cards (registered trademark) can be employed. Te memory card 38 can be utilized in other game apparatuses having a construction similar to the game apparatus 12, and thus, it is possible to offer the game data to other players via the memory card 38.

Although omitted in FIG. 1, the game apparatus 12 has an AV cable connector 58 (see FIG. 2) on the rear surface of the housing 16, and by utilizing the AV cable connector 58, a monitor 28 and a speaker 30 are connected to the game apparatus 12 through an AV cable 26. The monitor 28 and the speaker 30 are typically a color television receiver, and through the AV cable 26, a video signal from the game apparatus 12 is input to a video input terminal of the color television, and a sound signal from the game apparatus 12 is input to a sound input terminal thereof. Accordingly, a virtual three-dimensional game image of a three-dimensional (3D) video game, for example, is displayed on the screen of the color television (monitor) 28, and stereo game sound, such as a game music, a sound effect, etc. is output from right and left speakers 30. Around the monitor 28 (on the top side of the monitor 28, in this embodiment), a marker unit 32 including two infrared ray LEDs (markers) 32A and 32B is provided. The marker unit 32 is connected to the game apparatus 12 through a power source cable 32c. Accordingly, the marker unit 32 is supplied with power from the game apparatus 12. Thus, the markers 32A and 32B emit lights so as to output infrared rays ahead of the monitor 28.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

The controller 14, which is described in detail later, includes a first controller 34 and a second controller 36 each capable of being held with one hand as a first operation unit and a second operation unit, respectively. A cable 36a has one end extending from the rear end of the second controller 36 and the other end provided with a connector 36b. The connector 36b is connected to a connector 34a (FIG. 3, FIG. 5) provided on a rear end surface of the first controller 34. Input data obtained by the second controller 36 is applied to the first controller 34 through the cable 36a. The first controller 34 transmits controller data including the input data of the first controller 34 itself and the input data of the second controller 36.

In the game system 10, a user or a player turns the power of the game apparatus 12 on for playing the game (or applications other than the game) by a power switch 20a. Then, the user selects an appropriate optical disk 24 recording a program of a video game (or other applications the player wants to play), and loads the optical disk 24 into the disk drive 54 of the game apparatus 12. In response thereto, the game apparatus 12 starts to execute a video game or other applications on the basis of the program recorded in the optical disk 24. The user operates the controller 14 in order to apply an input to the game apparatus 12. For example, by operating any one of the operating buttons of the operating portion 82, a game or other application is started. Besides the operation performed on operating portion 82, by moving the controller 14 itself, it is possible to move a moving image object (player object) in different directions or change the perspective of the user (camera position of the virtual game) in a three-dimensional game world.

It should be noted that the video game and other application programs are stored (installed) in an internal memory (flash memory 44 (see FIG. 2)) of the game apparatus 12, and may be executed in the internal memory. In such a case, a program stored in a storage medium like an optical disk 24 may be installed in the internal memory, and the downloaded program may be installed in the internal memory.

Figure 2:
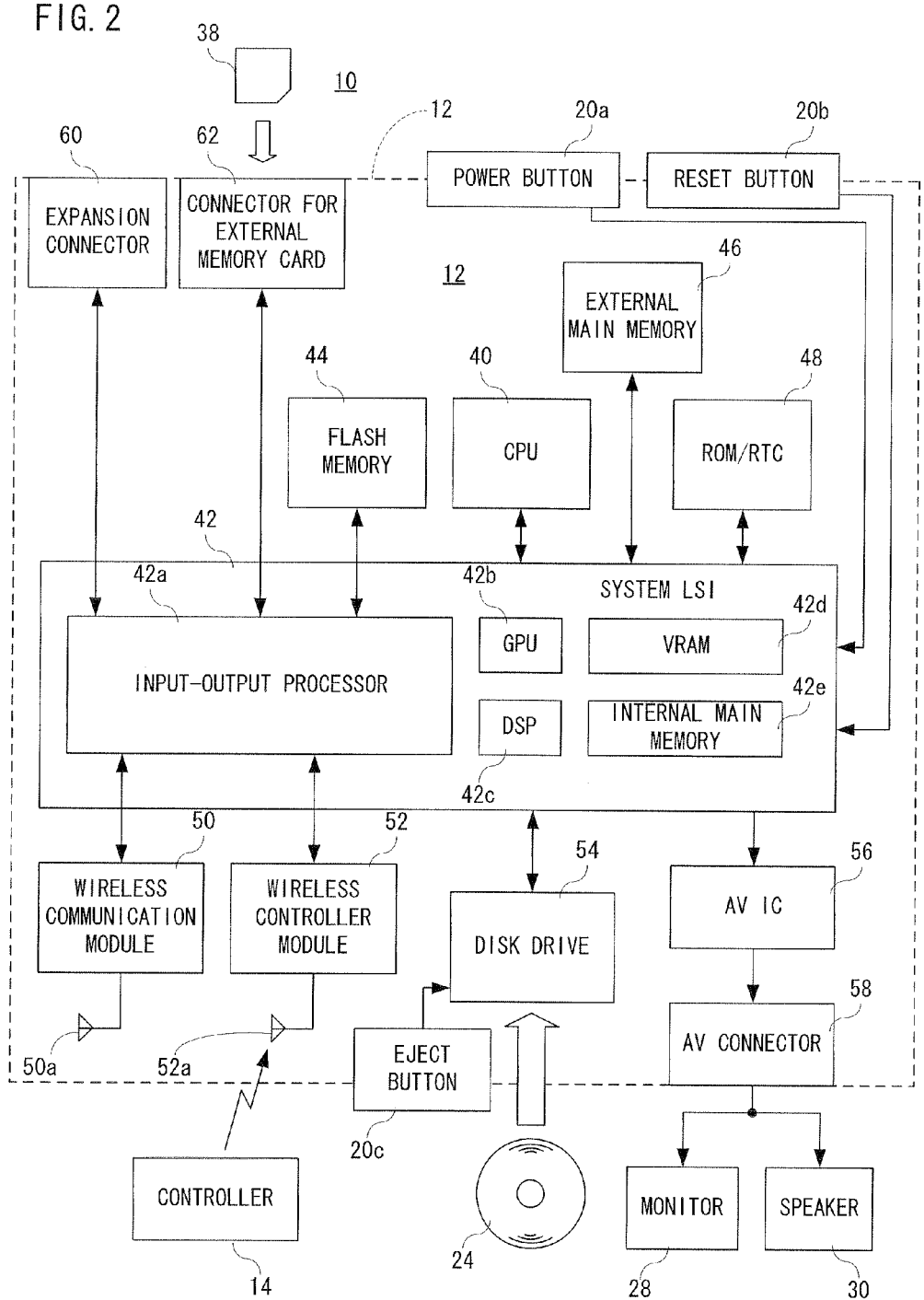
FIG. 2 is a block diagram showing an electric configuration of the game system.

FIG. 2 is a block diagram showing an electric configuration of the game system 10 shown in FIG. 1 embodiment. Although illustration is omitted, respective components within the housing 16 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, the disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program, texture data etc. from the optical disk 24, and writes them in an internal main memory 42*e* described later or the external main memory 46 under the control of the CPU 40.

The system LSI 42 is provided with an input-output processor 42*a*, a GPU (Graphics Processor Unit) 42*b*, a DSP (Digital Signal Processor) 42*c*, a VRAM 42*d* and an internal main memory 42*e*, and these are connected with one another by internal buses although illustration is omitted. The input-output processor (I/O processor) 42*a* executes transmission and reception of data and executes download of the data. The GPU 42*b* is made up of a part of a depicting means, and receives a graphics command (construction command) from the CPU 40 to generate game image data according to the command. Additionally, the CPU 40 applies an image generating program required for generating game image data to the GPU 42*b* in addition to the graphics command.

Although illustration is omitted, the GPU 42*b* is connected with the VRAM 42*d* as described above. The GPU 42*b* accesses the VRAM 42*d* to acquire data (image data: data such as polygon data, texture data, etc.) required to execute the construction command. Here, the CPU 40 writes image data required for depicting to the VRAM 42*d* via the GPU 42*b*. The GPU 42*b* accesses the VRAM 42*d* to create game image data for depicting.

In this embodiment, a case that the GPU 42*b* generates game image data is explained, but in a case that an arbitrary application except for the game application is executed, the GPU 42*b* generates image data as to the arbitrary application.

Furthermore, the DSP 42*c* functions as an audio processor, and generates audio data corresponding to a sound, a voice, music, or the like to be output from the speaker 30 by means of the sound data and the sound wave (tone) data stored in the internal main memory 42*e* and the external main memory 46.

The game image data and audio data generated as described above are read by the AV IC 56, and output to the monitor 28 and the speaker 30 via the AV connector 58. Accordingly, a game screen is displayed on the monitor 28, and a sound (music) necessary for the game is output from the speaker 30.

Furthermore, the input-output processor 42*a* is connected with a flash memory 44, a wireless communication module 50 and a wireless controller module 52, and is also connected with an expansion connector 60 and a connector for external memory card 62. The wireless communication module 50 is connected with an antenna 50*a*, and the wireless controller module 52 is connected with an antenna 52*a*.

The input-output processor 42*a* can communicate with other game apparatuses and various servers (both of them are not shown) to be connected to a network via a wireless communication module 50. The input-output processor 42*a* periodically accesses the flash memory 44 to detect the presence or absence of data (referred to as data to be transmitted) being required to be transmitted to a network, and transmits it to the network via the wireless communication module 50 and the antenna 50*a* in a case that data to be transmitted is present.

Furthermore, the input-output processor 42*a* receives data (referred to as received data) transmitted from another game apparatuses via the network, the antenna 50*a* and the wireless communication module 50, and stores the received data in the flash memory 44. In a case that the received data does not satisfy a predetermined condition, the reception data is abandoned as it is. In addition, the input-output processor 42*a* receives data (download data) downloaded from the server connected to the network via the network the antenna 50*a* and the wireless communication module 50, and stores the download data in the flash memory 44.

Furthermore, the input-output processor 42*a* receives input data transmitted from the controller 14 via the antenna 52*a* and the wireless controller module 52, and (temporarily) stores it in the buffer area of the internal main memory 42*e* or the external main memory 46. The input data is erased from the buffer area after being utilized in processing (game processing, for example) by the CPU 40.

Here, the input-output processor 42*a* can communicate with other game apparatuses directly without passing through the network via the wireless communication module 50.

In addition, the input-output processor 42*a* is connected with the expansion connector 60 and the connector for external memory card 62. The expansion connector 60 is a connector for interfaces, such as USB, SCSI, etc., and can be connected with medium such as an external storage and peripheral devices such as another controller different from the controller 14. Furthermore, the expansion connector 60 is connected with a cable LAN adaptor, and can utilize the cable LAN in place of the wireless communication module 50. The connector for external memory card 62 can be connected with an external storage like a memory card 38. Thus, the input-output processor 42*a*, for example, accesses the external storage via the expansion connector 60 and the connector for external memory card 62 to store and read the data.

Although a detailed description is omitted, as shown in FIG. 1 as well, the game apparatus 12 (housing 16) is furnished with the power button 20*a*, the reset button 20*b*, and the eject button 20*c*. The power button 20*a* is connected to the system LSI 42. When the power button 20*a* is turned on, the system LSI 42 is set to a mode of a normal energized state (referred to as "normal mode") in which the respective components of the game apparatus 12 are supplied with power through an AC adapter not shown. On the other hand, when the power button 20*a* is turned off, the system LSI 42 is set to a mode in which a part of the components of the game apparatus 12 is supplied with power, and the power consumption is reduced to minimum (hereinafter referred to as "standby mode").

In this embodiment, in a case that the standby mode is set, the system LSI 42 issues an instruction to stop supplying the power to the components except for the input-output processor 42*a*, the flash memory 44, the external main memory 46, the ROM/RTC 48 and the wireless communication module 50, and the wireless controller module 52. Accordingly, in this embodiment, in the standby mode, the CPU 40 never executes an application.

The reset button 20*b* is also connected to the system LSI 42. When the reset button 20*b* is pushed, the system LSI 42 restarts a start-up program of the game apparatus 12. The eject button 20*c* is connected to the disk drive 54. When the eject button 20*c* is pushed, the optical disk 24 is ejected from the disk drive 54.

FIG. 3 shows one example of an external appearance of the first controller 34. FIG. 3(A) is a perspective view of the first controller 34 as seeing it from above rear, and FIG. 3(B) is a perspective view of the first controller 34 as seeing it from below front. The first controller 34 has a housing 80 formed by plastic molding, for example. The housing 80 is formed into an approximately rectangular parallelepiped shape regarding a back and forth direction (Z-axis direction shown in FIG. 3) as a longitudinal direction, and has a size small enough to be held by one hand of a child and an adult. As one example, the housing 80 has a length or a width approximately the same as that of the palm of the person. A player can perform a game operation by means of the first controller 34, that is, by pushing buttons provided on it and by changing a position and a direction of the first controller 34 itself.

The housing 80 is provided with a plurality of operation buttons (operation key). That is, on the top surface of the housing 80, a cross key 82a, a 1 button 82b, a 2 button 82c, an A button 82d, a − button 82e, a menu button 82f, and a + button 82g are provided. Meanwhile, on the bottom surface of the housing 80, a concave portion is formed, and on the reward inclined surface of the concave portion, a B button 82h is provided. Each of the buttons (switches) 82a-82h is assigned an appropriate function according to a game program to be executed by the game apparatus 12. Furthermore, the housing 80 has a power switch 82i for turning on/off the power of the main body of the game apparatus 12 from a remote place on a top surface. The respective buttons (switches) provided on the first controller 34 may inclusively be indicated with the use of the reference numeral 82.

At the back surface of the housing 80, the above-described connector 34a is provided. The connector 34a is a 32 pin edge connector, for example, and utilized for connecting other devices to the first controller 34. In this embodiment, the connector 34a is connected with the connector 36b of the second controller 36. At the back end of the top surface of the housing 80, a plurality of LEDs 84 are provided, and the plurality of LEDs 84 show a controller number (identification number of the controller) of the controller 14. The game apparatus 12 can be connected with a maximum four controllers 14, for example. If a plurality of controllers 14 are connected to the game apparatus 12, a controller number is applied to the respective controllers 14 in the connecting order, for example. Each LED 84 corresponds to the controller number, and the LED 84 corresponding to the controller number lights up.

Furthermore, inside the housing 80 of the first controller 34, an acceleration sensor 86 (FIG. 5) is provided. As an acceleration sensor 86, acceleration sensors of an electrostatic capacity type can typically be utilized. The acceleration sensor 86 detects accelerations of a linear component for each sensing axis and gravitational acceleration out of the accelerations applied to a detection portion of the acceleration sensor. More specifically, in this embodiment, a three-axis acceleration sensor is applied to detect the respective accelerations in directions of three axes of a up and down direction (Y-axial direction shown in FIG. 3), a right and left direction (X-axial direction shown in FIG. 3), and a forward and rearward direction (Z-axial direction shown in FIG. 3) of the first controller 34.

It should be noted that as an acceleration sensor 86, two-axis acceleration sensors may be utilized for detecting any two of the directions of the accelerations out of the up and down direction, the right and left direction and the back and forth direction according to the shape of the housing 80, the limitation on how to hold the first controller 34, or the like. Under certain circumstances, a one-axis acceleration sensor may be used.

Figure 5:
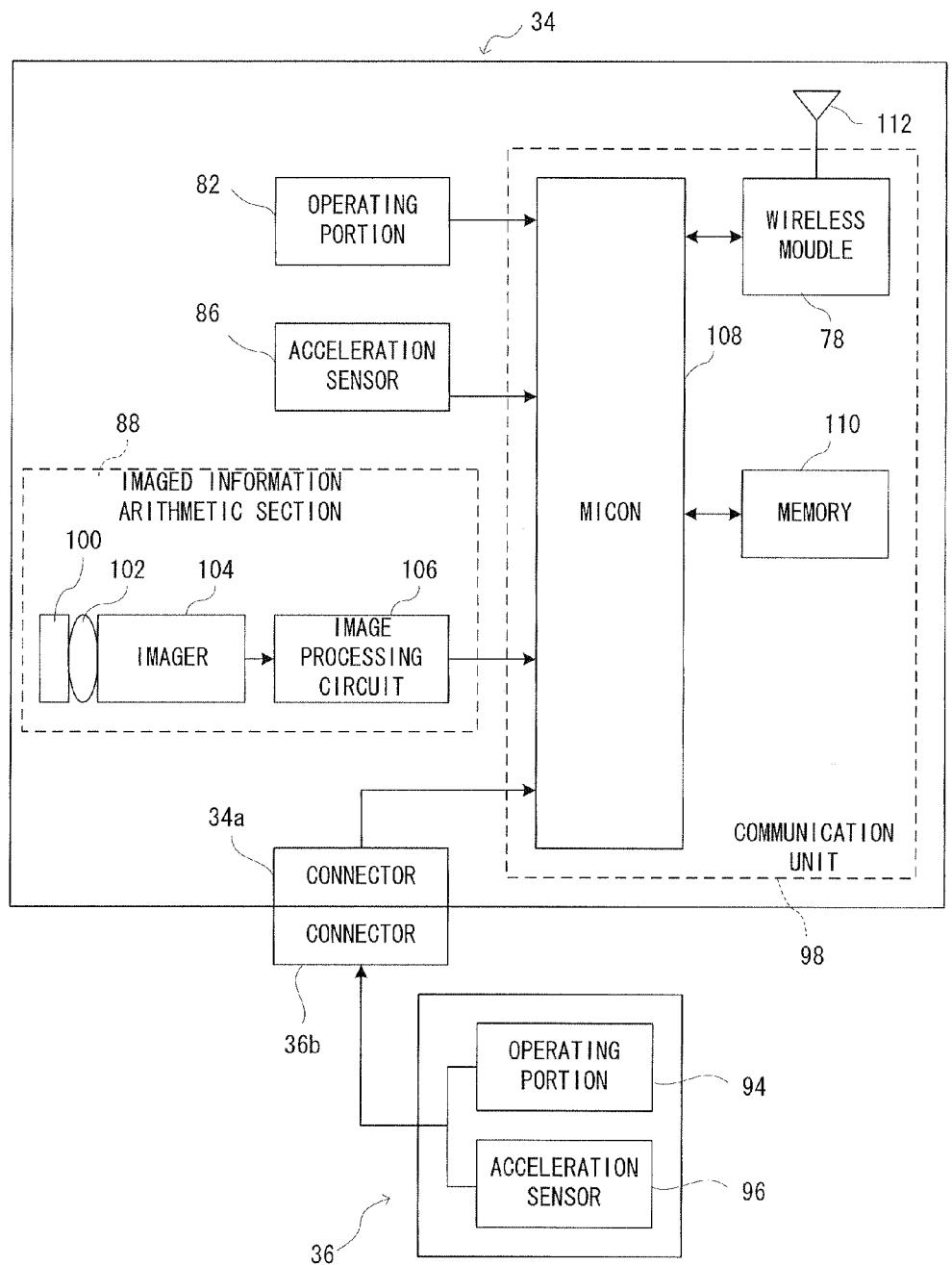
FIG. 5 is a block diagram showing an electric configuration of a controller (the first controller and the second controller are connected with each other)

In addition, the first controller 34 has an imaged information arithmetic section 88 (see FIG. 5). As shown in FIG. 3(B), on the front end surface of the housing 80, a light incident opening 90 of the imaged information arithmetic section 88 is provided, and from the light incident opening 90, infrared rays emitted by the markers 44m and 44n of the sensor bar 44 are captured.

FIG. 4 shows one example of an appearance of the second controller 36. FIG. 4(A) is a perspective view of the second controller 36 as seeing it from above rear, and FIG. 4(B) is a perspective view of the second controller 36 as seeing it from below front. Additionally, in FIG. 4, the cable 36a of the second controller 36 is omitted.

The second controller 36 has a housing 92 formed by plastic molding, for example. The housing 92 is formed into an approximately thin long elliptical shape in the forward and backward directions (Z-axis direction in FIG. 4) when viewed from plan, and the width of the right and left direction (X-axis direction in FIG. 4) at the back end is narrower than that of the front end. Furthermore, the housing 92 has a curved shape as a whole when viewed from a side, and downwardly curved from a horizontal portion at the front end to the back end. The housing 92 has a size small enough to be held by one hand of a child and an adult similar to the first controller 34 as a whole, and has a longitudinal length (in the Z-axis direction) slightly shorter than that of the housing 80 of the first controller 34. Even with the second controller 36, the player can perform a game operation by operating buttons and a stick, and by changing a position and a direction of the controller by moving itself.

At the end of the top surface of the housing 92, an analog joystick 94a is provided. At the end of the housing 92, a front edge slightly inclined backward is provided, and on the front edge are provided a C button 94b and a Z button 94c vertically arranged (Y-axis direction in FIG. 4). The analog joystick 94a and the respective buttons 94b and 94c are assigned appropriate functions according to a game program to be executed by the game apparatus 12. The analog joystick 94a and the respective buttons 94b and 94c provided to the second controller 36 may be inclusively denoted by means of the reference numeral 94.

Inside the housing 92 of the second controller 36, an acceleration sensor 96 (FIG. 5) is provided. As the acceleration sensor 96, an acceleration sensor similar to the acceleration sensor 86 in the first controller 34 is applied. More specifically, the three-axis acceleration sensor is applied in this embodiment, and detects accelerations in the respective three axis directions like an up and down direction (Y-axial direction shown in FIG. 4), a right and left direction (X-axial direction shown in FIG. 4), and a forward and backward direction (Z-axial direction shown in FIG. 4) of the second controller 36.

Additionally, the shapes of the first controller 34 shown in FIG. 3 and the second controller 36 shown in FIG. 4 and the shape, the number and the setting position of the buttons (switches, stick, or the like), etc. are merely one example, and can be changed to other shapes, numbers and setting positions, etc. as needed.

Furthermore, the controller 14 is powered by a battery (not illustrated) detachably housed in the first controller 34. The second controller 36 is powered through the connector 34a, the connector 40, and the cable 36a.

FIG. 5 shows one example of an electric configuration of the controller 14 when the first controller 34 and the second controller 36 are connected with each other. The first controller 34 has a communication unit 98, and the communication unit 98 is connected with the operating portion 82, the acceleration sensor 86, the imaged information arithmetic section 88 and the connector 34a. The operating portion 82 indicates the above-described operation buttons or operating switches

82a-82i. When the operating portion 82 is operated, an operation signal (key information) is applied to the communication unit 98. The data indicative of acceleration detected by the acceleration sensor 86 is output to the communication unit 98. The acceleration sensor 86 has in the order of a maximum sampling period of 200 frames per second.

The data taken in by the imaged information arithmetic section 88 is also output to the communication unit 98. The imaged information arithmetic section 88 is constituted by an infrared filter 100, a lens 102, an imager 104 and an image processing circuit 106. The infrared filter 100 passes only infrared rays from the light incident from the light incident opening 90 at the front of the first controller 34. As described above, the markers 44m and 44n of the sensor bar 44 placed near (around) the display screen of the monitor 30 are infrared LEDs for outputting infrared lights forward the monitor 30. Accordingly, by providing the infrared filter 100, it is possible to image the image of the markers 44m and 44n more accurately. The lens 102 condenses the infrared rays passing thorough the infrared filter 100 to emit them to the imager 104. The imager 104 is a solid imager, such as a CMOS sensor and a CCD, for example, and images the infrared rays condensed by the lens 102. Accordingly, the imager 104 images only the infrared rays passing through the infrared filter 100 to generate image data. Hereafter, the image imaged by the imager 104 is called an "imaged image". The image data generated by the imager 104 is processed by the image processing circuit 106. The image processing circuit 106 calculates positions of objects to be imaged (markers 44m and 44n) within the imaged image, and outputs marker coordinates data including each coordinate value indicative of the position to the communication unit 98 for each predetermined time (one frame, for example). It should be noted that a description of the image processing circuit 106 is made later.

The connector 34a is connected with the connector 36b of the cable 36a extending from the second controller 36. The connector 36b is connected with the operating portion 94 and the acceleration sensor 96 of the second controller 36. The operating portion 94 denotes the above-described analog joystick 94a and operation buttons 94b and 94c. When the operating portion 94 is operated, an operation signal is applied to the communication unit 98 via the cable 36a, the connector 36b, the connector 34a, etc. The acceleration sensor 96 also has a sampling period similar to that of the acceleration sensor 86, and applies the data indicative of the detected acceleration to the communication unit 98.

The communication unit 98 includes a microcomputer (micon) 108, a memory 110, a wireless module 78 and an antenna 112. The micon 108 transmits the obtained data to the game apparatus 12 and receives data from the game apparatus 12 by controlling the wireless module 78 while using the memory 110 as a memory area (working area and buffer area) in processing.

The data output from the operating portion 82, the acceleration sensor 86 and the imaged information arithmetic section 88 of the first controller 34, and the operating portion 94 and acceleration sensor 96 of the second controller 36 to the micon 108 is temporarily stored in the memory 110. The wireless transmission from the communication unit 98 to the Bluetooth communication unit 76 of the game apparatus 12 is performed every predetermined cycle. The game processing is generally performed by regarding 1/60 seconds as a unit, and therefore, it is necessary to perform the transmission from the first controller 34 at a cycle equal to or shorter than it. The micon 108 outputs data including the operation data of the operating portions 82 and 94 and the acceleration data of the acceleration sensors 86 and 96, and marker coordinates data from the imaged information arithmetic section 88 stored in the memory 110 to the wireless module 78 as controller data when transmission timing to the game apparatus 12 has come. The wireless module 78 modulates a carrier of a predetermined frequency by the controller data, and emits its weak radio wave signal from the antenna 112 by using a short-range wireless communication technique, such as Bluetooth. Namely, the controller data is modulated to the weak radio wave signal by the wireless module 78 and transmitted from the first controller 34. The weak radio wave signal is received by the Bluetooth communication unit 76 of the game apparatus 12. The weak radio wave thus received is subjected to demodulating and decoding processing, thus making it possible for the game apparatus 12 to obtain the controller data. The CPU 46 of the game apparatus 12 performs the game processing on the basis of the controller data obtained from the controller 14.

It will be appreciated by those skilled in the art from the description of this specification that a computer, such as a processor (CPU 46, for example) of the game apparatus 12 or the processor (micon 108, for example) of the controller 14 executes processing on the basis of an acceleration signal output from the acceleration sensors 86 and 96, and whereby, more information relating to the controller 14 can be estimated or calculated (determined). In a case that processing is executed on the side of the computer assuming that the first controller 34 and second controller 36 respectively incorporated with the acceleration sensors 86 and 96 are in a static state (that is, processing is executed considering that accelerations detected by the acceleration sensors 86 and 96 are only gravitational accelerations), if the first controller 34 and the second controller 36 are actually in a static state, it is possible to know whether or not the orientations of the first controller 34 and the second controller 36 are inclined with respect to the direction of gravity or to what extent they are inclined on the basis of the detected acceleration. More specifically, when a state in which the detection axes of the acceleration sensors 86 and 96 are directed to a vertically downward direction is taken as a reference, merely whether or not 1G (gravitational acceleration) is imposed on can show whether or not each of the first controller 34 and the second controller 36 is inclined, and the size can show to what extent each of them is inclined. Furthermore, if a multi-axes acceleration sensor is applied, by further performing processing on an acceleration signal of each axis, it is possible to more precisely know to what extent the first controller 34 and the second controller 36 are inclined with respect to the direction of gravity. In this case, on the basis of outputs from the acceleration sensors 86 and 96, the computer may perform processing of calculating data of inclined angles of the first controller 34 and second controller 36, but perform processing of estimating an approximate inclination on the basis of the outputs from the acceleration sensors 86 and 96 without performing the processing of calculating the data of the inclined angle. Thus, by using the acceleration sensors 86 and 96 in conjunction with the computer, it is possible to determine an inclination, an orientation or a position of each of the first controller 34 and second controller 36.

On the other hand, assuming that the acceleration sensors 86 and 96 are in a dynamic state, accelerations according to the movement of the acceleration sensors 86 and 96 are detected in addition to the gravitational acceleration component, and therefore, if the gravitational acceleration component is removed by predetermined processing, it is possible to know a moving direction, etc. More specifically, in a case that the first controller 34 and the second controller 36 respectively being furnished with the acceleration sensors 86 and 96 are accelerated and moved by the hands of the user, acceleration signals generated by the acceleration sensors 86 and 96 are processed by the above-described computer, and whereby, it is possible to calculate various movements and/or positions of the first controller 34 and the second controller 36. Additionally, even when assuming that the acceleration sensors 86 and 96 are in a dynamic state, if an acceleration in correspondence with the movement of each of the acceleration sensors 86 and 96 is removed by the predetermined processing, it is possible to know the inclination with respect to the direction of gravity. In another embodiment, each of the acceleration sensors 86 and 96 may contain a built-in signal processing apparatus or other kinds of dedicated processing apparatuses for performing desired processing on the acceleration signal output from the incorporated acceleration detecting means before outputting the signal to the micon 108. For example, in a case that the acceleration sensors 86 and 96 are ones for detecting a static acceleration (gravitational acceleration, for example), the built-in or dedicated processing apparatuses may be ones for transforming the detected acceleration signal into the inclined angle (or other preferable parameters) corresponding thereto.

Figure 6:
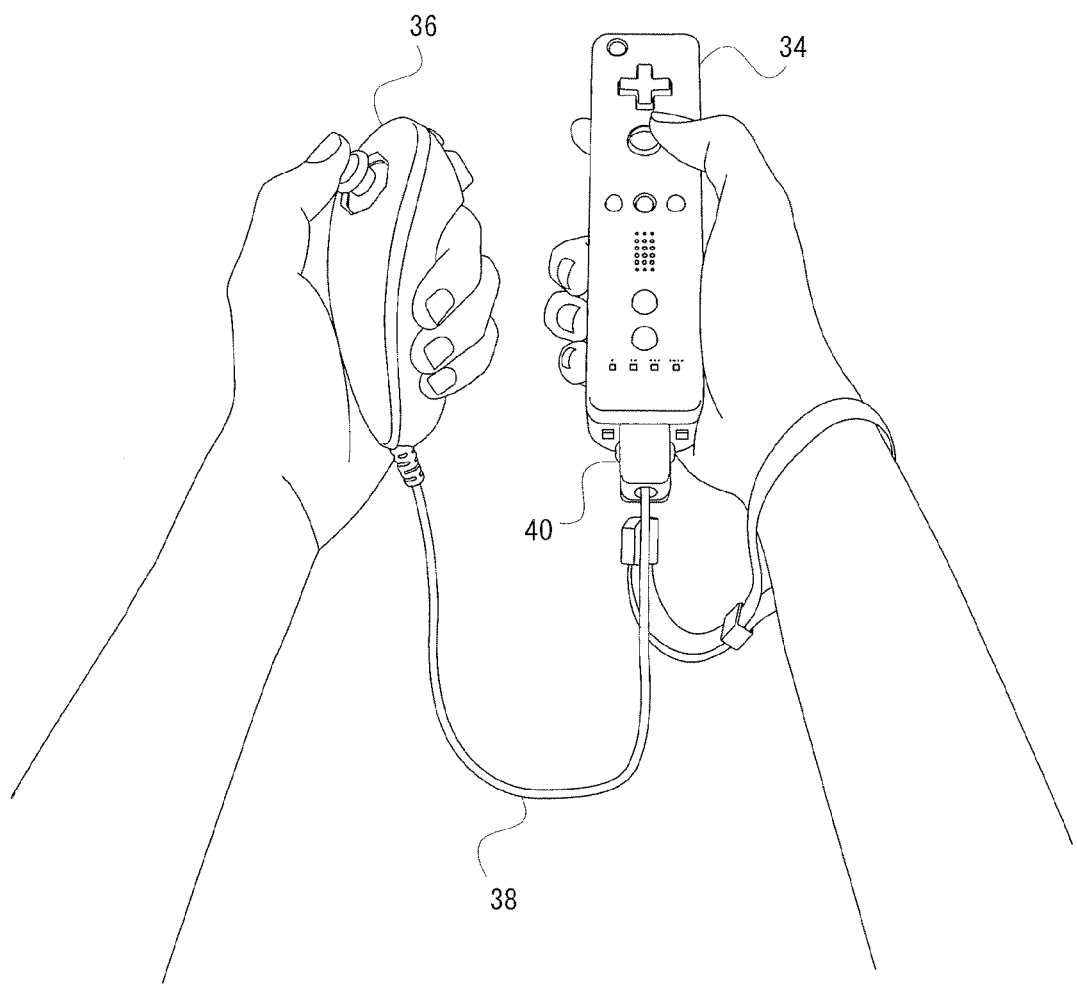
FIG. 6 is an illustrative view summarizing a situation that a virtual game is played by utilizing the controllers.

In this game system 10, a user can make an operation or input to the game by moving the controller 14. In playing the game, the user holds the first controller 34 with the right hand and the second controller 36 with the left hand as shown in FIG. 6. As described above, in this embodiment, the first controller 34 contains the acceleration sensor 86 for detecting accelerations in the three-axis directions, and the second controller 36 also contains the same acceleration sensor 96. When the first controller 34 and the second controller 36 are moved by the user, acceleration values respectively indicating the movements of the controllers are detected by the acceleration sensor 86 and the acceleration sensor 96. In the game apparatus 12, game processing can be executed according to the detected acceleration values.

Furthermore, the first controller 34 is provided with the imaged information arithmetic section 88, and this makes it possible for the user to utilize the first controller 34 as a pointing device. In this case, the user holds the first controller 34 with the edge surface (light incident opening 90) of the first controller 34 directed to the markers 44*m* and 44*n*. It should be noted that as understood from FIG. 1, the markers 44*m* and 44*n* are placed around a predetermined side (top or bottom) of the monitor 30 in parallel with a predetermined side. In this state, the user can perform a game operation by changing a position on the screen instructed with the first controller 34 by moving the first controller 34 itself, and by changing distances between the first controller 34 and each of the markers 44*m* and 44*n*.

Figure 7:
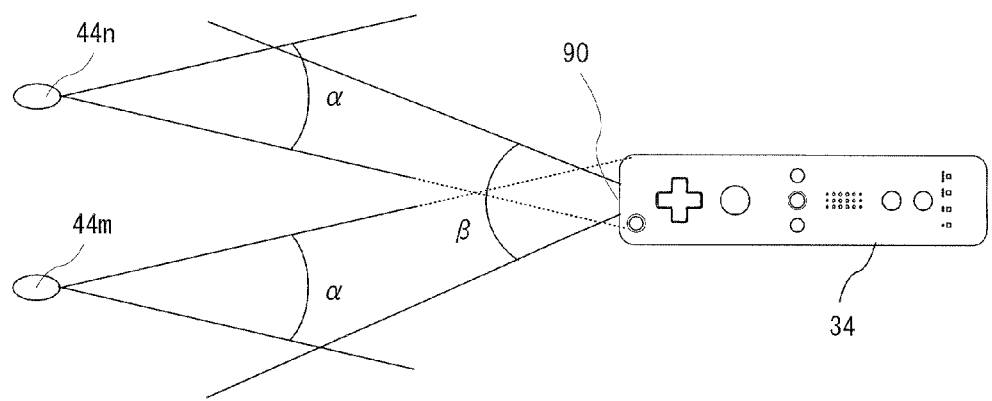
FIG. 7 is an illustrative view showing viewing angles of a marker and a controller.

FIG. 7 is a view explaining viewing angles between the respective markers 44*m* and 44*n*, and the first controller 34. As shown in FIG. 7, each of the markers 44*m* and 44*n* emits infrared ray within a range of a viewing angle α. Also, the imager 104 of the imaged information arithmetic section 88 can receive incident light within the range of the viewing angle β taking the line of sight of the first controller 34 (Z axis direction in FIG. 3) as a center. For example, the viewing angle α of each of the markers 44*m* and 44*n* is 34° (half-value angle) while the viewing angle β of the imager 104 is 42°. The user holds the first controller 34 such that the imager 104 is directed and positioned so as to receive the infrared rays from the markers 44*m* and 44*n*. More specifically, the user holds the first controller 34 such that at least one of the markers 44*m* and 44*n* exists in the viewing angle β of the imager 104, and the first controller 34 exists in at least one of the viewing angles α of the marker 44*m* or 44*n*. In this state, the first controller 34 can detect at least one of the markers 44*m* and 44*n*. The user can perform a game operation by changing the position and the orientation of the first controller 34 in the range satisfying the state. Also, in a case that any one of the makers 44*m* and 44*n* is only detected, by setting temporary marker coordinates in place of the other marker which is not detected by means of data detecting the previous two makers 44*m* and 44*n*, an instructed position by the first controller 34 can be calculated.

If the position and the orientation of the first controller 34 are out of the range, the game operation based on the position and the orientation of the first controller 34 cannot be performed. Hereafter, the above-described range is called an "operable range."

Figure 8:
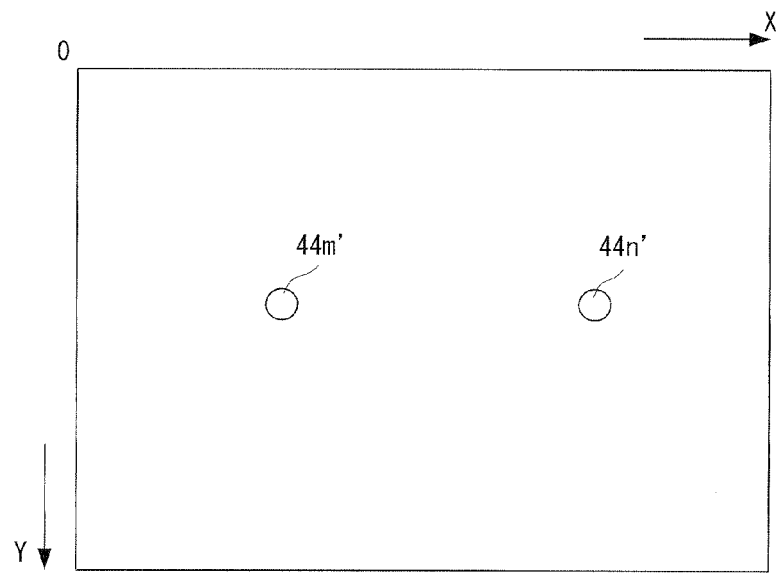
FIG. 8 is an illustrative view showing one example of an imaged image by the controller.

If the first controller 34 is held within the operable range, an image of each of the markers 44*m* and 44*n* is imaged by the imaged information arithmetic section 88. That is, the imaged image obtained by the imager 104 includes an image (object image) of each of the markers 44*m* and 44*n* as an object to be imaged. FIG. 8 is an illustrative view showing one example of the imaged image including object images. The image processing circuit 106 calculates coordinates (marker coordinates) indicative of the position of each of the markers 44*m* and 44*n* in the imaged image by utilizing the image data of the imaged image including the object images 44*m′* and 44*n′*.

Since the object images 44*m′* and 44*n′* appear as high-intensity parts in the image data of the imaged image, the image processing circuit 106 first detects the high-intensity parts as a candidate of the object images. Next, the image processing circuit 106 determines whether or not each of the high-intensity parts is an object image on the basis of the size of the detected high-intensity part. The imaged image may include images other than the object image due to sunlight through a window and light of a fluorescent lamp in the room as well as the two object images 44*m′* and 44*n′* (marker images). The determination processing whether or not the high-intensity part is an object image is executed for discriminating the images 44*m′* and 44*n′* of the two markers 44*m* and 44*n* as object images from the images other than them, and accurately detecting the object images. In order to discriminate the object images 44*m′* and 44*n′* in the imaged image from other images, the imaging objects 44*m* and 44*n* are necessary to be known, and in this embodiment, the size is decided in advance, and therefore, it is possible to estimate the size of the marker images 44*m′* and 44*n′*. Thus, on the basis of the size of the high-intensity part, it is possible to make a determination of the marker images 44*m′* and 44*n′*. More specifically, in the determination process, it is determined whether or not each of the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 106 calculates the position of the high-intensity part. More specifically, the barycenter position of the high-intensity part is calculated. Here, the coordinates of the barycenter position is called a "marker coordinates". Also, the barycenter position can be calculated with more detailed scale than the resolution of the imager 104. Now, the resolution of the imaged image imaged by the imager 104 shall be 126×96, and the barycenter position shall be calculated with the scale of 1024×768. That is, the marker coordinates is represented by the integer from (0, 0) to (1024, 768).

Additionally, as shown in FIG. 8, the position in the imaged image is represented in a coordinate system (X-Y coordinate system of the imaged image) by taking the upper left of the imaged image as an original point O, the downward direction as the Y-axis positive direction, and the right direction as the X-axis positive direction.

Furthermore, in a case that the object images 44m' and 44n' are accurately detected, two high-intensity parts are determined as object images by the determination processing, and therefore, it is possible to calculate two marker coordinates. The image processing circuit 106 outputs data indicative of the calculated two marker coordinates, that is, imaging object data indicative of positions of the imaging objects to the communication unit 98. The output imaging object data (marker coordinate data) is included in the controller data by the micon 108 as described above, and transmitted to the game apparatus 12.

When taking in the marker coordinate data from the received controller data, the game apparatus 12 (CPU 46) can calculate a designated position (designated coordinates) of the first controller 34 on the screen of the monitor 30 and the distance from the first controller 34 to each of the markers 44m and 44n on the basis of the marker coordinate data. For example, when the first controller 34 designates the left end of the monitor 30, the object images 44m' and 44n' are detected at the right of the imaged image, and when the first controller 34 designates the lower end of the screen, the object images 44m' and 44n' are detected at the upper portion of the imaged image. In other words, the marker coordinates on the imaged image are detected at positions reverse to the designated position of the first controller 34 on the screen. Accordingly, when the coordinates of the designated position of the first controller 34 are calculated from the marker coordinates, the coordinate system is appropriately transformed from the coordinate system of the imaged image in FIG. 8 to a coordinate system for representing positions on the screen.

Additionally, in this embodiment, the first controller 34 performs predetermined arithmetic processing on the imaged data to detect the marker coordinates, and transmit the marker coordinate data to the game apparatus 12. However, in another embodiment, imaged data is transmitted as controller data from the first controller 34 to the game apparatus 12, and the CPU 46 of the game apparatus 12 performs predetermined arithmetic processing on the imaged data to detect the marker coordinates and the coordinates of the designated position.

Furthermore, the distance between the object images in the imaged image is changed depending on the distance between the first controller 34 and each of the markers 44m and 44n. Since the distance between the markers 44m and 44n, the width of the imaged image, and the viewing angle of the imager 104 are decided in advance, by calculating the distance between the two marker coordinates, the game apparatus 12 can calculate the current distance between the first controller 34, and each of the markers 44m and 44n.

Here, an operation method of the game may be another manner, and the game may be performed only by utilizing the first controller 34. Example is a game in which the first controller 34 is operated by being horizontally held with both hands.

Figure 9:
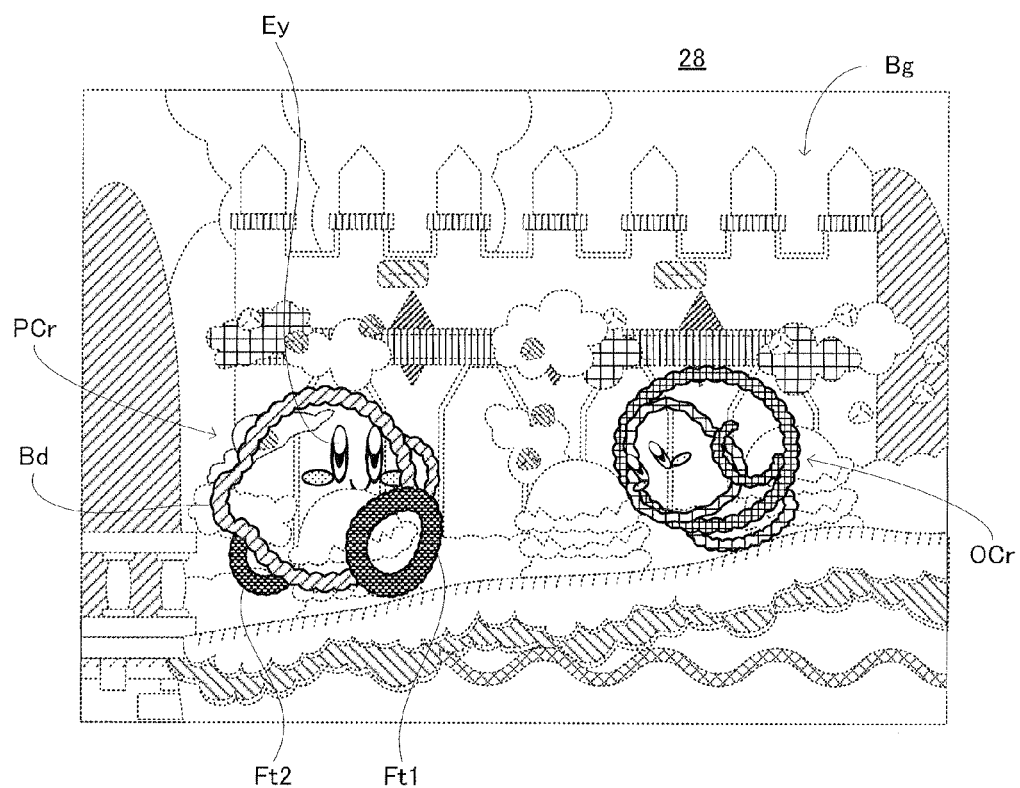
FIG. 9 is an illustrative view showing one example of a game screen.
Figure 26:
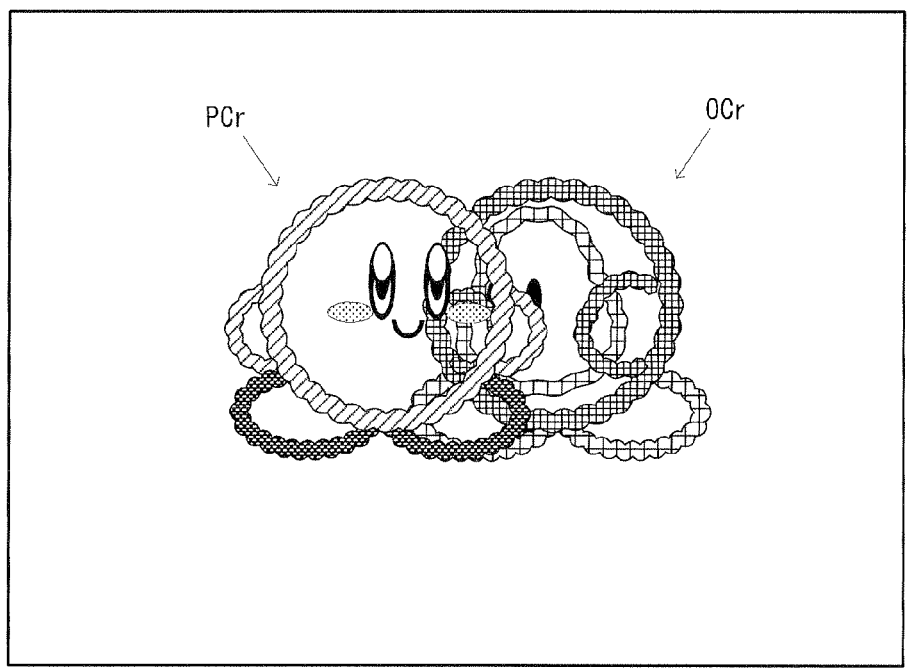
FIG. 26(A) is an illustrative view showing a depicting example in a case that the player character is overlapped with an enemy character.
FIG. 26(B) shows Z data for depicting corresponding to FIG. 26(A)
FIG. 26(C) shows Z data for sorting corresponding to FIG. 26(A).

When in the game system 10 configured as described above, a "yarn character" game of this embodiment is played, a game screen as shown in FIG. 9, for example, is displayed on the monitor 28. On the game screen, at the innermost (Z depth), a rampart, a plantation, etc. being formed by a patch-work are depicted as a background Bg, and in front of the background Bg (Z front), a character Cr, for example, a player character PCr, an enemy character OCr, etc. are depicted. It should be noted that the player character PCr is depicted to be in front of the enemy character OCr (see FIG. 26: details are described later).

The player character PCr is formed of a body Bd having a pink yarn loop, feet Ft1 and Ft2 each having a red yarn loop, and eyes, cheeks and moth, etc. (simply referred to as "eyes Ey") arranged within the inside of the body Bd (that is, the inside of the yarn loop forming of the body B). Although illustration is omitted, the eyes Ey may be hard to view under the cloak of the background Bg, and thus a translucent "mist" is arranged at the back of the eyes Ey.

The fact to be especially noticed with respect to the player character PCr is that the inside of the body Bd is transparent, so the background Bg is visible through the body Bd while the foot at the back Ft2 is invisible as understood from FIG. 9. With respect to the foot at the front Tf1 as well, the inside thereof is transparent, so that, in ordinary circumstances, the body Bd is visible through the foot Tf1, but the body Bd is invisible and only the background Bg is visible.

The enemy character OCr is also formed of a yellow yarn, for example, and the background Bg is visible through the enemy character OCr.

Depicting processing for implementing such a characteristic game screen is explained in detail. First, processing of producing a yarn line model is explained.

An image of the yarn forming of the character Cr is created as shown in a manner in FIG. 10-FIG. 15. First, each control point CP for constructing a contour (edge) Ed of the character Cr as shown in FIG. 10(A) is defined. More specifically, coordinates (x, y) of each control point CP is set regarding a reference point RP as an original point (0, 0), and control point data indicating a set result is stored (control point area 76a: see FIG. 19). In the control point data, a parameter (k) indicating easiness of displacement (softness), that is, a degree of offset in correspondence with a moving state is described for each control point CP.

Next, from the control point CP thus defined, a line model LM as shown in FIG. 10(B) is generated. The line model LM has a width (d1) corresponding to a unit texture UTx shown in FIG. 12(A), and is generated in a procedure shown in FIG. 11(A) to FIG. 11(C), for example.

First, as shown in FIG. 11(A), as to control point CP1, CP2, CP3 . . . , a tangent vector and a normal vector are evaluated. For example, as to the control point CP3, an inclination of a straight line L1 passing through both of the adjacent control points CP2 and CP4 is first evaluated as a tangent vector, and a vector vertical to the tangent vector (inclination of a straight line L2 vertical to the straight line L1) may be evaluated as a normal vector.

Next, as shown in FIG. 11(B), a line segment being in parallel with the normal vector and having a length of d1 is assigned as an offset (Ofs) with each of the control points CP1, CP2, CP3 . . . centered, and coordinates of both ends of each offset Ofs1, Ofs2, Ofs3 . . . are calculated. On the basis of the calculation result, a pair of offset points (OP1a, OP1b), (OP2a, OP2b), (OP3a, OP3b) . . . is respectively arranged one either side to a series of control points CP1, CP2, CP3 . . . .

Next, as shown in FIG. 11(C), the adjacent three offset points are connected to one another to make polygons. More specifically, from a first set of offset points (OP1a, OP1b, OP2b), a polygon Pg1a is generated, from a second set of offset points (OP1a, OP2a, OP2b), a polygon Pg1b is generated. From a third set of offset points (OP2a, OP2b, OP3b), a polygon Pg2a is generated, and from a fourth set of offset points (OP2a, OP3a, OP3b), a polygon Pg2b is generated.

From a fifth set of offset points (OP3a, OP3b, OP4b), a polygon Pg3a is generated, and from a sixth sets of offset points (OP3a, OP4a, OP4b), a polygon Pg3b is generated.

The polygon Pg1a, Pg1b, Pg2a . . . thus generated constructs a line polygon model with one side (a pair of vertexes) shared. When the line polygon model is classified into a pair of polygons (Pg1a, Pg1b), (Pg2a, Pg2b), (Pg3a, Pg3b) . . . each sharing one side (a pair of vertexes), a series of quadrangle (trapezoidal shape) Sq1, Sq2, Sq3 . . . each having the width d1 can be obtained. On each of the quadrangles Sq1, Sq2, Sq3 . . . , a unit texture UTx of the knitting pattern as shown in FIG. 12(A) is pasted. By performing such processing on each part of the character Cr, a line model LM forming of a contour Ed of each part can be obtained.

Here, the unit texture UTx has a rectangular shape with a width d1 and a length d2, and the endpoints (leading endpoint and rear endpoint) in a length direction are translucent (set to be higher in transmittance than in the central point). The length d2, here, is a length capable of obtaining a successive knit-like pattern when a plurality of the unit textures UTx are connected such that the translucent portions are overlapped with each other as shown in FIG. 12(B).

Here, when a portion high in curvature is included in the contour Ed, the offsets Ofs1 and Ofs2 are intersected with each other as shown in FIG. 13 to thereby cause the unit textures UTx to be overwritten to thereby tear the shape and the color of the line model LM as shown in FIG. 14(A), for example. In such a case, a correction of changing in connection is made as shown in FIG. 13(B). The correction processing prevents the unit textures UTx from being overwritten, and a line model LM with little tearing even in the portion in high curvature can be obtained as shown in FIG. 14(B) for example. Here, when the unit texture UTx is pasted on the quadrangle Sq1, Sq2, Sq3 . . . , it is possible to obtain a line model LM with little tearing as well by performing processing of making deformation to match the quadrangle shape.

Additionally, in a case that an endpoint occurs to the contour Ed, processing of pasting a cap-shape texture is performed to thereby obtain the line model LM with a round endpoint.

Next, processing of moving the character Cr being made up of such line models LM (animation processing) is explained. For example, the player character PCr is depicted on an initial screen as shown in FIG. 16(A). That is, the player character PCr is full-faced at first, and both of the feet Ft1 and Ft2 are at the back of the body Bd. When an input indicating a movement to the right is issued from the controller 14, the player character PCr starts "walking" of moving to the right with the feet Ft1 and Ft2 acting. During walking, one foot Ft2 is at the back of the body Bd, and the other foot Ft1 is in front of the body Bd.

Such a "walking" animation of the player character PCr, that is, an overall translation and a movement of the feet are implemented by performing following processing on the control point data (76) describing the coordinates of each control point CP as described above. First, the reference point RP of the player character PCr is moved to the right direction on the basis of input data (76k: see FIG. 19) from the input device 14. Hereupon, the respective control points CP are moved following the movement of the reference point RP. By reflecting the movement on the control point data, the whole player character PCr is translated to the right direction.

Next, the respective control points CP corresponding to the feet Ft1 and Ft2 are displaced on the basis of the "walking" animation data (76c: see FIG. 19) prepared in advance. By reflecting the displacement on the control point data, a "walking" motion can be given to the feet Ft1 and Ft2.

Here, in the animation data, a displacement for each frame of each control point CP is preferably described, but a displacement for every predetermined frame, for example, every five frames. In this case, displacements from the second to fourth frames during the first to fifth frames are calculated on the interpolation based on the first frame and the fifth frame (linear interpolation, for example).

Furthermore, at a time of switching from one animation to another animation, a motion blend of blending displacements of the two motions before and after the switch (linear interpolation, for example) is performed. The motion blend is processing for each control point CP, so that if the number of control points CP is different between before and after the switch, processing of matching the number (recalculation of the control points CP, for example) is performed.

Thus, by displacing the control points CP on the basis of the input data and/or animation data, it is possible to arbitrarily move (translate and/or rotationally move) the character Cr and give various motions to each part of the character Cr.

In addition, in correspondence with the moving state of the character Cr, the character Cr may be changed. For example, as shown in FIG. 17(A), in a case that the player character PCr is moved in a direction and at a velocity according to a velocity vector MV following a "jumping" animation, a force in a direction reverse to the velocity vector MV and with a magnitude in correspondence with the velocity vector MV due to a virtual air resistance, etc. is worked on the player character PCr. As a result, the player character PCr becomes deformed as shown in FIG. 17(B), for example. The degree of deformation is different for each position.

Such a deformation in correspondence with the moving state of the character Cr is implemented as follows, for example. First, as shown in FIG. 17(A), a position of the reference point PR predetermined frames before (five frames before, for example) with respect to the current reference point RP is set. In this case, the line segment L connecting the reference point RP and the offset point OP is in parallel with the velocity vector MV, and has a length proportional to the velocity vector MV. Each of the control point CP1, CP2, CP3 . . . of the character Cr is displaced in a direction reverse to the velocity vector MV by the length proportional to the product of each of the parameters k1, k2, k3 . . . indicating easiness of displacement and each of the distances D1, D2, D3 . . . from the offset point OP.

Accordingly, if displacement is approximately constant (k1≈k2≈k3), the control point CP2 at the parietal region close to the offset point OP is largely displaced whereas the control points CP1, CP3 at the cheeks and the back far from the offset point OP is small displaced, so that the player character PCr looks as if it becomes deformed by undergoing the air resistance as shown in FIG. 17(B).

Next, processing of depicting the player character PCr is explained. As described above, the player character PCr is depicted as shown in FIG. 16(A) in an initial state, and depicted as shown in FIG. 16(B) during walking. That is, as shown in FIG. 16(A), the feet Ft1 and Ft2 at the back are not visible through the body Bd, and moreover, the body Bd and the foot Ft2 at the back are not visible through the foot Ft1 as shown in FIG. 16(B). It should be noted that in FIG. 16-FIG. 18, the background Bg is omitted, but the background Bg at the innermost is visible through the body Bd and/or the feet Ft1, Ft2.

The player character PCr having such transparency is depicted as follows, for example. First, in a case that the player character PCr shown in FIG. 16(A) is depicted, a transparent mask (polygon model) BMs having a contour along the body Bd is generated, and the feet Ft1 and Ft2, the mask of the body BMs, the body Bd, and the eyes Ey are arranged from the innermost in this order as shown in FIG. 18(A). In other words, as to each element (polygon model) as shown in FIG. 18(A), Z data for indicating an arrangement in a depth direction (Z direction) (see FIG. 20(A)) is generated.

Next, a Z-sorting as to the respective elements as shown in FIG. 18(A) is performed. That is, aside from the aforementioned Z data for depicting, Z data for sorting (see FIG. 20(B)) indicating a depicting order of the respective elements shown in FIG. 18(A) is generated. Then, the respective elements are depicted on the background Bg, undergoing a Z comparison by the Z data for depicting in an order according to the Z data for sorting.

Accordingly, basically, depicting is made according to an order of "mask of the body BMs→feet Ft1, Ft2→body Bd→eyes Ey" according to the Z data for sorting in FIG. 20(B), but in execution of each depicting, a Z comparison is made by the Z data for depicting, and the polygon which is determined to be a Z-rejection (being at the back of the one depicted before) is not depicted, and only the polygon which is determined to be a Z-acceptance (being in front of the one depicted before) is depicted.

More specifically, according to the Z data for sorting, the first element from the innermost is the "mask of the body", and thus, the mask of the body BMs is first depicted. Here, in the first depicting, there is no object to undergo the Z comparison, and thus, it is determined to be a Z-acceptance. Next, according to the Z data for sorting, the second element from the innermost is the "line of the foot", and thus, the feet Ft1 and Ft2 are depicted, but before that, the "line of the foot" and the "mask of the body" are compared by the Z data for depicting. According to the Z data for depicting, the "line of the foot" is at the back of the "mask of the body", and thus, the feet Ft1 and Ft2 are not depicted at the part overlapped with the mask of the body BMs, and depicted at only the part not overlapped with the mask of the body BMs.

Next, according to the Z data for sorting, the third element from the innermost is the "line of the body", and according to the Z data for depicting, the "line of the body" is at the back of the "line of the foot" and the "mask of the body", and thus, the whole body Bd is depicted. Next, according to the Z data for sorting, the fourth element from the innermost (that is, the foremost) is "eyes", and according to the Z data for depicting, the "eyes" are in front of the "line of the body", the "line of the foot" and the "mask of the body", and thus the whole eyes Ey are depicted.

Thus, it is possible to depict the player character PCr shown in FIG. 16(A) for which the background Bg is visible through the body Bd and/or the feet Ft1, Ft2, but the feet Ft1, Ft2 are invisible through the body Bd.

On the other hand, in a case that the player character PCr as shown in FIG. 16(B) is depicted, a transparent mask (polygon model) FMs having a contour along the foot at the front Ft1 is further generated in addition to the aforementioned mask of the body BMs as shown in FIG. 18(B). Then, the foot at the back Ft2, the mask of the body BMs, the body Bd, the eyes Ey, the mask of the foot at the front FMs and the foot at the front Ft1 are arranged from the innermost in this order to thereby generate Z data for depicting (see FIG. 21(A)) as to the respective elements as shown in FIG. 18(B).

Next, as to the respective elements as shown in FIG. 18(B), z-sorting is performed to generate Z data for sorting (see FIG. 21(B)). Then, each element is depicted on the background Bg by the Z data for depicting, undergoing a Z comparison in an order according to the Z data for sorting.

In this case, according to the Z data for sorting shown in FIG. 21(B), depicting is made according to the order of "mask of the body BMs→mask of the foot at the front FMs→foot at the back Ft2→body Bd→eyes Ey→foot at the front Ft1", but in execution of each depicting, Z comparison is made by the Z data for depicting, and the polygon which is determined to be a Z-rejection is not depicted, and only the polygon which is determined to be a Z-acceptance is depicted.

More specifically, according to the Z data for sorting, a first element from the innermost is the "mask of the body", and thus, the mask of the body BMs is first depicted. Next, according to the Z data for sorting, a second element from the innermost is the "mask of the foot at the front", and according to the Z data for depicting, the "mask of the foot at the front" is in front of the "mask of the body", thus, the mask of the foot at the front FMs is depicted. Next, according to the Z data for sorting, a third element from the innermost is the "line of the foot at the back", and thus, according to the Z data for depicting, the "line of the foot at the back" is at the back of the "mask of the foot at the front" and the "mask of the body", and thus, the foot at the back Ft1 is not depicted at a part overlapped with the mask of the body BMs and/or the mask of the foot at the front FMs, and is depicted at a part not overlapped with both of the masks.

Next, according to the Z data for sorting, a fourth element from the innermost is the "line of the body", and according to the Z data for depicting, the "line of the body" is in front of the "line of the foot at the back" and the "mask of the body" but is at the back of the "mask of the foot at the front", and thus, the body Bd is not depicted at a part overlapped with the "mask of the foot at the front", and is depicted only at a part not overlapped with the "mask of the foot at the front". Then, according to the Z data for sorting, a fifth element from the innermost is the "eyes", and according to the Z data for depicting, the "eyes" are in front of the "line of the body", the "mask of the body" and the "line of the foot at the back" but are at the back of the "mask of the foot at the front", and thus, the eyes Ey are not depicted at a part overlapped with the "mask of the foot at the front", and are depicted only at a part not overlapped with the "mask of the foot at the front". Next, according to the Z data for sorting, a sixth element from the innermost (that is, the formost) is the "line of the foot at the front", and according to the Z data for depicting, the "line of the foot at the front" is in front of the "mask of the foot at the front", the "eyes", the "line of the body", the "mask of the body" and the "line of the foot at the back", and thus, the whole foot at the front Ft1 is depicted.

Thus, it is possible to depict the player character PCr as shown in FIG. 16(B) for which the background Bg is visible through the body Bd and/or the feet Ft1, Ft2 while the foot at the back Ft2 is invisible through the body Bd, and the body Bd is invisible through the foot at the front Ft1.

Here, the player character PCr may sometimes overlap with the enemy character OCr, but in this embodiment, as shown in FIG. 26(A), the enemy character OCr is always displayed at the back of the player character PCr. Such a character image can be depicted in the procedure similar to the aforementioned one on the basis of the Z data for depicting as shown in FIG. 26(B) and the Z data for sorting as shown in FIG. 26(C). The enemy character OCr is depicted faster than the mask of the body BMs so as not to undergo a mask by the mask of the body BMs.

Figure 19:
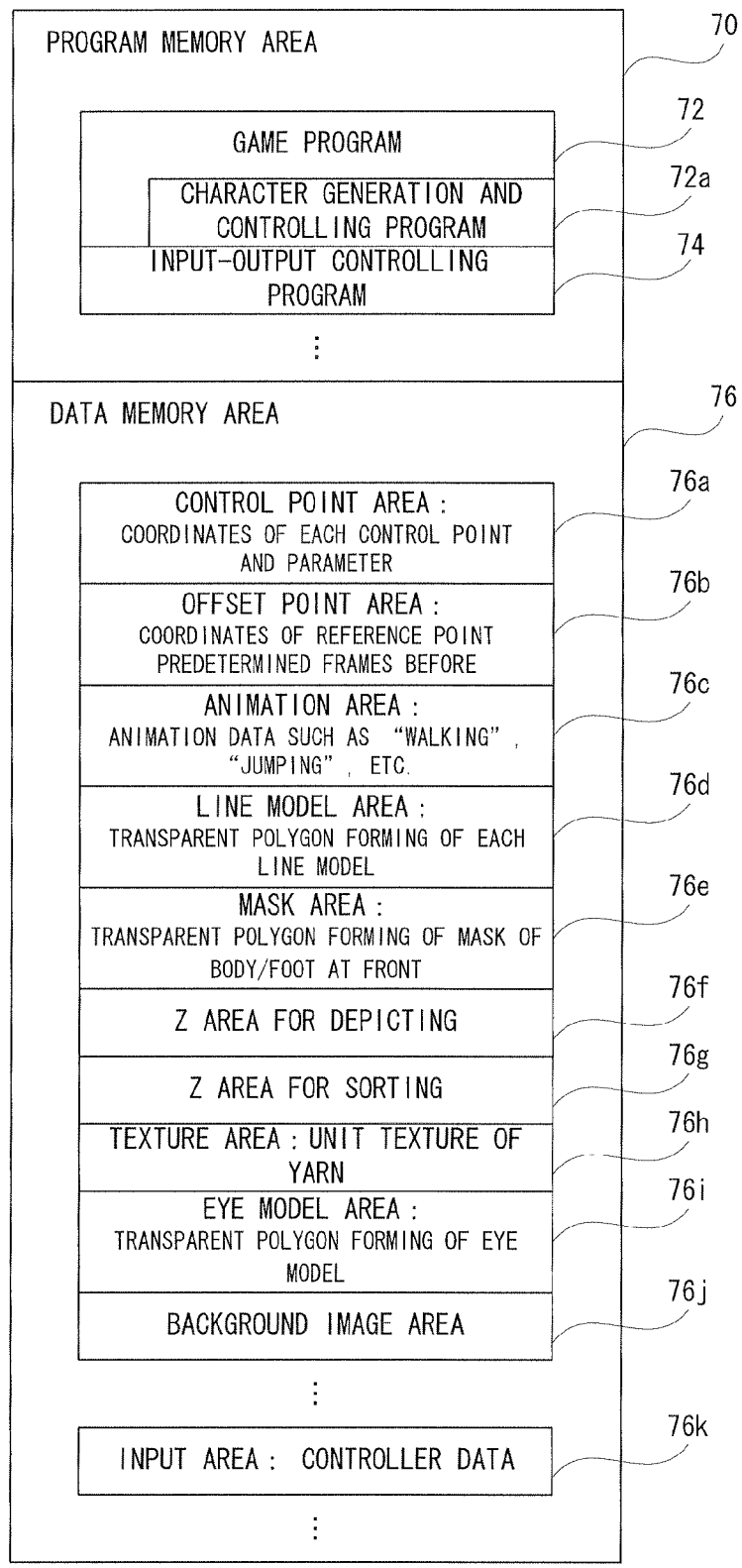
FIG. 19 is an illustrative view showing a part of a memory map of a main memory.

The image processing as described above is implemented to execute flowcharts in FIG. 22-FIG. 25 by the CPU 40 in cooperation with the system LSI 42 on the basis of the programs and data shown in FIG. 19-FIG. 21, etc. that are stored in the main memory 42e and/or 46a.

The main memory 42e and/or 46 is formed with a program memory area 70 and a data memory area 76 as shown in FIG.

19, and in the program memory area 70, a game program 72, an input-output controlling program 74, etc. are stored. The game program 72 is software implementing the "yarn character" game by controlling the entire hardware of the game apparatus 12 (see FIG. 2) via the CPU 40, and includes a character generation and depicting controlling program 72a corresponding to flowcharts in FIG. 22 to FIG. 25. The character generation and depicting controlling program 72a controls generation and depicting of the character Cr as described above. The input-output controlling program 74 mainly controls an output of the image depicted in the VRAM 42d via the input-output processor 42a to the monitor 28 and an input from the controller 14.

The data memory area 76 includes a control point area 76a, an offset point area 76b, an animation area 76c, a line model area 76d, a mask area 76e, a Z area for depicting 76f, a Z area for sorting 76g, a texture area 76h, an eye model area 76i, a background image area 76j, etc. In the control point area 76a, control point data describing coordinates (x, y) and a parameter k as to a control point CP (see FIG. 10(A)) for forming a contour Ed of each character Cr is stored. Here, the coordinates (x, y) are a coordinate system taking the reference point RP as an origin point (0, 0), and the parameter k is a parameter indicating easiness of displacement (softness), in other words, a degree of offset to be applied to each control point in correspondence with the moving state.

In the offset point area 76b, offset point data indicating coordinates of the offset point OP (see FIG. 17(B)) being the reference point RP predetermined frames before is stored. In the animation area 76c, animation data indicating motions (see FIG. 16, FIG. 17), such as "walking", "jumping" given to the player character PCr is stored. In the animation data, a displacement of each control point CP for each frame (or displacement for each predetermined frames) is described.

In the line model area 76d, a line model LM (see FIG. 10(B)) generated based on the control point CP is stored. The line model LM is made up of the translucent line polygon model (Pg1a, Pg1b, Pg2a . . . ), for example, as shown in FIG. 11(C). In the mask area 76e, the mask of the body BMs and the mask of the foot at the front FMs as shown in FIG. 18(A) and FIG. 18(B) are stored. Each mask is constructed of a transparent polygon model.

Figure 15:
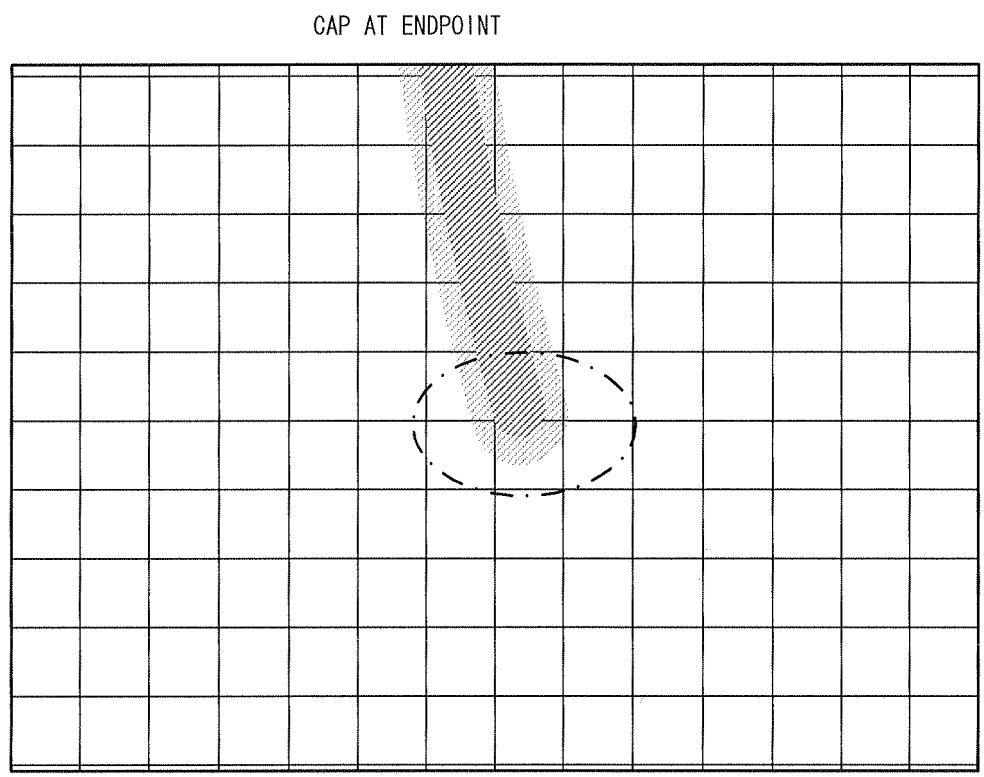
FIG. 15 is an illustrative view showing one example of endpoint processing of the line model.

In the Z area for depicting 76f, the Z data for depicting as shown in FIG. 20(A) and FIG. 21(A) is stored. In the Z area for sorting 76g, the Z data for sorting as shown in FIG. 20(B) and FIG. 21(B), for example, is stored. In the texture area 76h, the unit texture UTx being a rectangular having the width d1 and the length d2 as shown in FIG. 12(A) is stored. As shown in FIG. 15, a chap-shaped texture and other textures are also stored in the texture area 76h.

In the eye model area 76i, an eye model Ey as shown in FIG. 16(A), FIG. 18(A), etc. is stored. The eye model Ey is constructed of a translucent polygon model, for example. In the background image area 76j, image data of the background Bg as shown in FIG. 9, for example is stored.

Additionally, in the data memory area 76, the input area 76k storing the input data (controller data) from the controller 14 is also stored.

When the "yarn character" game is played, the CPU 40 executes character generation and drawing controlling processing as shown in FIG. 22 to FIG. 25. Although illustration is omitted, the input-output processing (including input processing from the controller 14 to the input area 76k and output processing from the VRAM 42d to the monitor 28) by the input-output processor 42a is performed in parallel with the controlling processing.

The CPU 40 first executes initial processing in a step S1. In the initial processing, reading various initial data from the memory card 38, etc. onto the main memory 42e, 46, initialization of the VRAM 42d, etc. are performed. It should be noted that the initial control point data read here are produced by utilizing an edit function of NURBS (Non-Uniform Rational B-Spline) curve on MAYA (registered trademark) as one of the three-dimensional CAD, for example. The CPU 40 generates control point data in each time point on the basis of the initial control point data.

After completion of the initial processing, the processing by the CPU 40 enters a loop constructed of steps S3 to S21. The loop processing is executed for every frame. In the step S3, on the basis of the input data stored in the input area 76k, the reference point RP (see FIG. 10(A)) is moved. Here, the reference point RP may be moved according to a predetermined algorithm even when there is no input. In the step S5, respective control points CP making up of the whole player character PCr are translated following the movement of the reference point RP, and the control point data stored in the control point area 76a are updated on the basis of the result. In the step S7, on the basis of the animation data stored in the animation area 76c, the respective control points CP making up of a part or the whole of the player character PCr are individually moved, and on the basis of the result, the control point data is further updated.

Here, in a case that data of the current frame is not included in the animation data, data of the current frame is generated by interpolation based on the frames before and after the current frame, and the movement in the step S7 is executed. Furthermore, when animation is switched, a motion blend is executed, and on the basis of the data after belend, the movement in the step S7 is executed.

In the step S9, each control point CP is offset in correspondence with the moving state in the steps S5 and S7, and on the basis of the result, the control point data is further updated. More specifically, in a case that the player character PCr "jumps" and moves according to the velocity vector MV as shown in FIG. 17(A), the position of the reference point RP predetermined frames before with respect to the current reference point RP is first set as an offset point OP. Next, as shown in FIG. 17(B), each control point CP1, CP2, CP3 . . . of the character Cr is displaced by the distance proportional to the product of the parameter k1, k2, k3 . . . indicating easiness of displacement and the distance D1, D2, D3 . . . from the offset point OP in the direction reverse to the velocity vector MV. Thus, the control point CP2 at the parietal region is largely displaced whereas the control point CP1, CP3 at the cheeks and the back are displaced small, so that the player character PCr looks as if it becomes deformed by undergoing the air resistance.

In the step S11, on the basis of the control point data after the series of the updates as described above, the line model LM corresponding to each of the body and the both feet of the player character PCr is generated in a manner shown in FIG. 11, and on the basis of the result, the model of the line model area 76d is updated (see FIG. 24: described later). Specifically, the line model of the body Bd is generated in the step S11a, the line model Ft1 of one foot is generated in the step S11b, and the line model Ft2 of the other foot is generated in the step S11c. Although illustration is omitted, the line model of the enemy character OCr may also be generated in the step S11.

In the step S13, on the basis of the control point data, the mask of the body BMs, and the mask of the foot FMs are further generated. Specifically, in the step S13a, the mask of the body BMs as shown in FIG. 16(A) is first generated, and on the basis of the result, the mask of the mask area 76e is updated. Next, in the step S13b, it is determined whether or not the feet are in front of the body on the basis of the animation data. If both of the feet are at the back of the body, "NO" is determined in the step S13b to proceed to the step S14. If at least one foot is in front of the body, "YES" is determined in the step S13b, the process proceeds to the step S13c to generate the mask of the foot FMs, and then, the process proceeds to the step S14.

Accordingly, as shown in FIG. 16(A), if both of the feet Ft1, Ft2 are at the back of the body Bd, only the mask of the body BMs is generated as shown in FIG. 18(A). Alternatively, if only the one foot Ft1 is in front of the body Bd as shown in FIG. 16(B), the mask of the body BMs and the mask of the foot at the front FMs are generated as shown in FIG. 18(B). Further alternatively, both of the feet Ft1, Ft2 are in front of the body Bd as shown in FIG. 17(A), the two masks of the foot at the front FMs are generated (illustration is omitted).

In the step S14, on the basis of the animation data, the Z data for depicting (FIG. 20(A), FIG. 21(A), see FIG. 26(B)) indicating an array in the Z direction are generated with respect to each of the elements (Ey, Bd, BMs, Ft1, (FMs,) Ft2: FIG. 18(A), see FIG. 18(B)) of the current player character PCr and the enemy character OCr (see FIG. 26(A)), and the data of the Z area for depicting 76f is updated by the result.

Figure 23:
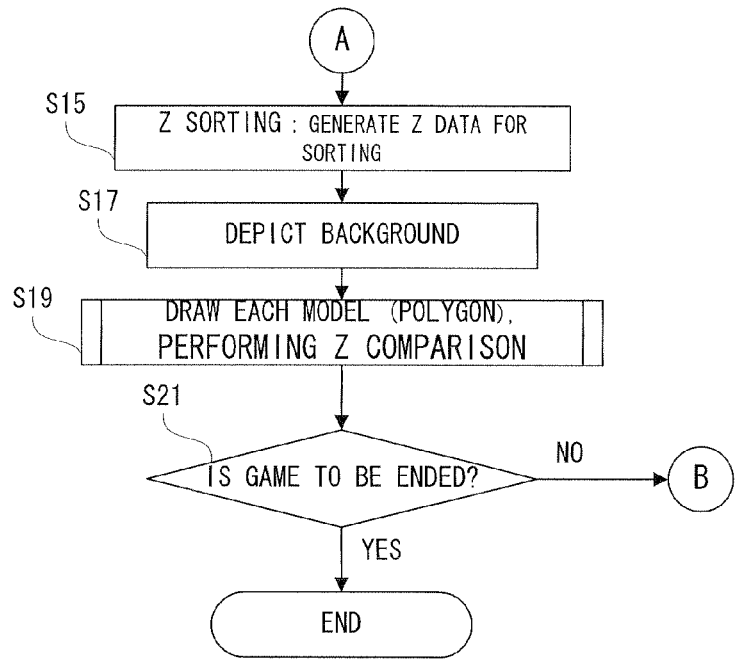
FIG. 23 is a flowchart showing another part of the operation by the CPU.

Referring to FIG. 23, in the step S15, the Z data for sorting (FIG. 20(B), FIG. 21(B), see FIG. 26(C)) indicating a depicting order is generated with respect to each of the elements of the player character PCr and the enemy character OCr on the basis of the animation data, and the data of the area for sorting 76g is updated by the data.

In the step S17, on the basis of the background image data stored in the background image area 76j, the background Bg is depicted in the VRAM 42d via the GPU 42b. In the step S19, each element of the player character PCr and the enemy character OCr are depicted in the VRAM 42d in an order according to the Z data for sorting stored in the Z area for sorting 76g (see FIG. 20(B), FIG. 21(B), FIG. 26(C)) while undergoing a Z comparison on the basis of the Z data for depicting (FIG. 20(A), FIG. 21(A), see FIG. 26(B)) stored in the Z area for depicting 76f (see S25: described later). The image data which undergoes the series of depicting in the VRAM 42d is output to the monitor 28 by the input-output processor 42a to thereby display the game screen shown in FIG. 9 on the monitor 28.

Then, in the step S21, it is determined whether or not a game is to be ended, and if "NO", the process returns to the step S3 to repeat the aforementioned processing for every frame. When data indicating an end is input from the controller 14, "YES" is determined in the step S21, and the processing is ended.

Figure 24:
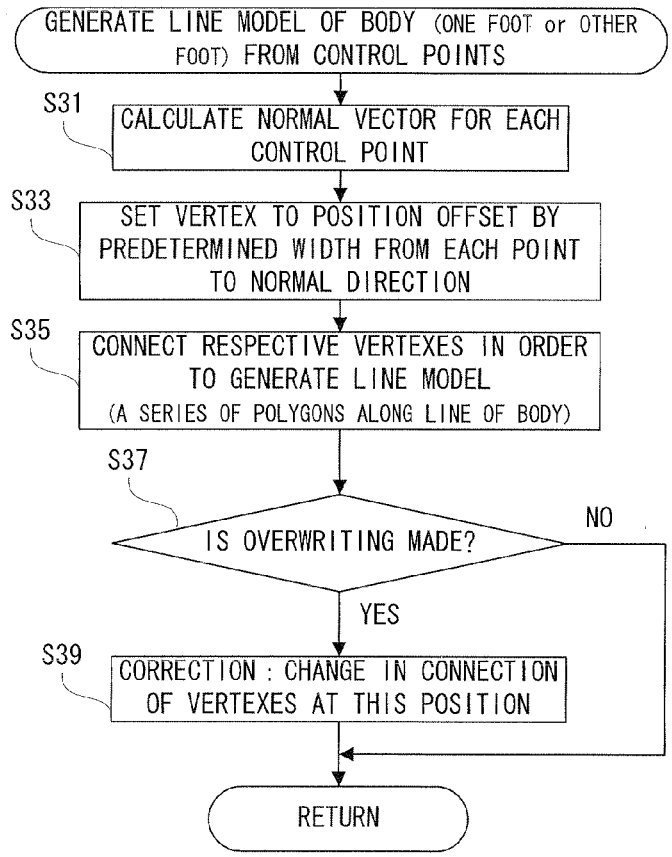
FIG. 24 is a flowchart showing still another part of the operation by the CPU.

The each line model generating processing in the aforementioned steps S11a to S11c is executed according to a subroutine in FIG. 24, for example. The line model of the enemy character OCr may also be generated similarly. The CPU 40 first calculates a normal vector for each control point CP in a step S31. It should be noted that the normal vector calculating method has already been explained by utilizing FIG. 11(A). Next, in a step S33, a pair of offset points OPa and OPb (vertexes) is set at a position offset by a predetermined width (d1) to the direction of the normal from each control point CP. Here, the offset processing has already been explained by utilizing FIG. 11(B). Next, in a step S35, the respective vertexes are connected in order to generate a series of polygons along the line of the body (line model LM). Here, the line model LM generation processing has already been explained by utilizing FIG. 11(C). Next, in a step S37, it is determined whether or not overwriting as shown in FIG. 14(A) is made on the line model LM, and if "NO", the process is restored to the main routine (FIG. 22). If the lines connecting the vertexes (offset Ofs1, Ofs2) intersect with each other as shown in FIG. 13(A), "YES" is determined in the step S37, and the process proceeds to a step S39. In the step S39, the vertexes are changed in connection in a manner as shown in FIG. 13(B), for example. Thus, the line model LM with no overwriting as shown in FIG. 14(B) can be obtained. Thereafter, the process is restored to the main routine (FIG. 22).

Figure 25:
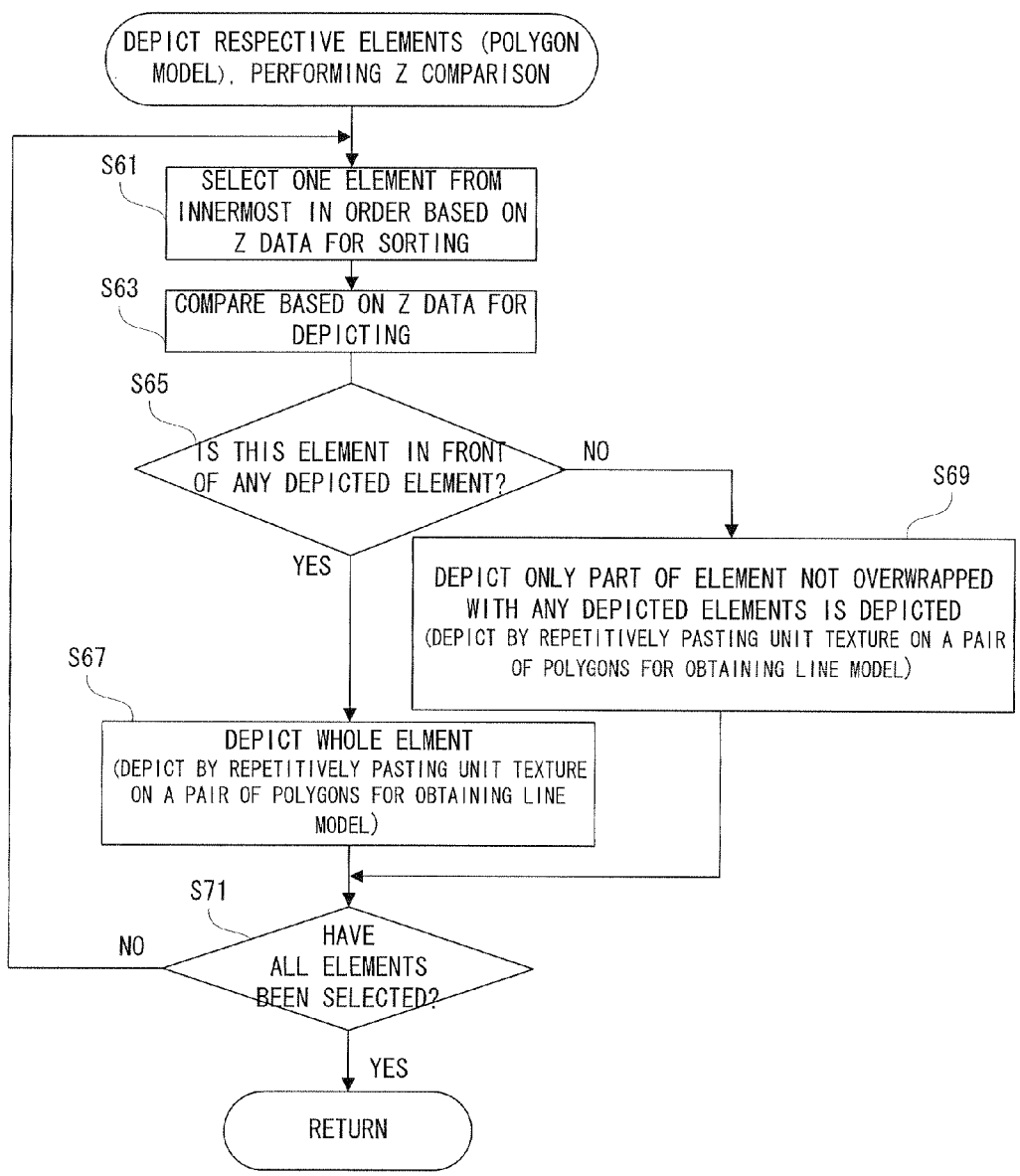
FIG. 25 is a flowchart showing a further part of the operation by the CPU.

Processing of performing a Z comparison on each element in the aforementioned step S19 is executed according to a subroutine in FIG. 25. The CPU 40 first selects one element from the innermost in order on the basis of the Z data for sorting in a step S61. Next, in a step S63, the currently selected element is compared based on the depicted element and the Z data for depicting, and in a next step S65, it is determined whether or not this element is in front of all the depicted elements. It should be noted that since there is no depicted element yet for the first time around (here, the background Bg has already been depicted in the preceding step S17), "YES" is determined. If "YES" in the step S63, all of the elements are depicted in the VRAM 42d in a step S67. On the other hand, if "NO" in the step S63, a part of the element, specifically, only the part that is not overlapped with any depicted element is depicted in the VRAM 42d in a step S69. In depicting, the unit texture UTx as shown in FIG. 12(A) is repetitively pasted on each quadrangle Sq1, Sq2 ... (see FIG. 11(C)) being made up of a pair of polygons. Thus, the line model LM as shown in FIG. 12(B) with a knit pattern at a cycle d2 can be obtained. After depicting, the process proceeds to a step S71 to determine whether or not all the elements have been selected, and if "NO", the process returns to the step S61 to repeat similar processing while if "YES", the process is restored to the main routine (FIG. 20).

Accordingly, in a case that with respect to each element shown in FIG. 18(A), the order shown in FIG. 20(B) is described in the Z data for sorting, and the order shown in FIG. 20(A) is described in the Z data for depicting, the "mask of the body" is selected for a first time around in the step S61, a Z comparison is performed in the step S63, "YES" is determined in the step S65, and the whole mask of the body BMs is depicted in the step S67. At a second, in the step S61, the "line of the foot" is selected, but in the Z comparison in the step S63, the "line of the foot" is at the back of the "mask of the body", and therefore, the determination result in the step S65 becomes "NO". Thus, in the step S69, the feet Ft1 and Ft2 are not depicted at a part overlapped with the mask of the body BMs and are depicted only at a part not overlapped therewith.

Similarly, the "line of the body" selected at a third time is in front of both of the "line of the foot" and the "mask of the body", and thus, the whole body Bd is depicted. The "eyes" selected at the fourth time are in front of any of the "line of the body", the "line of the foot" and the "mask of the body", thus, the whole eyes Ey are depicted. Thus, on the background Bg depicted in the preceding step S17 in the VRAM 42d, the player character PCr as shown in FIG. 16(A) is further depicted. In this case, the mask of the body BMs is transparent, and therefore, the background Bg is visible through the body Bd.

Additionally, in a case that with respect to each element shown in FIG. 18(B), the order shown in FIG. 21(B) is described in the Z data for sorting, and the order shown in FIG. 21(A) is described in the Z data for depicting, the "mask of the body is selected in the step S61 for a first time around, the Z comparison is performed in the step S63, "YES" is determined in the step S65, and then, the whole mask of the body BMs is depicted in the step S67. At a second time, in the step S61, the "mask of the foot at the front" is selected, in the Z comparison in the step S63, the "mask of the foot at the front" is in front of the "mask of the body", thus the determination result in the step S65 becomes "YES". Consequently, the whole mask of the foot at the front FMs is depicted in the step S69. At a third time, in the step S61, the "line of the foot at the back" is selected, but in the Z comparison in the step S63, the "line of the foot at the back" is at the back of both of the "mask of the body" and the "mask of the foot at the front", and thus, the determination result in the step S65 becomes "NO". Accordingly, in the step S69, the foot at the back Ft2 is not depicted at a part overlapped with the mask of the body BMs and/or the mask of the foot at the back FMs and is depicted only at the part not overlapped with the mask of the body BMs and the mask of the foot at the back FMs. At a fourth time, in the step S61, the "line of the body" is selected, in the Z comparison in the step S63 the "line of the body" is in front of both of the "line of the foot at the back" and the "mask of the body" but is at the back of the "mask of the foot at the front", thus, in the determination result in the step S65, "NO" is determined. Accordingly, in the step S69, the body Bd is not depicted at a part overlapped with the mask of the foot at the front FMs and is depicted only at a part not overlapped with this.

Similarly, the "eyes" selected at a fifth time is in front of any of the "line of the foot at the back", the "mask of the body" and the "line of the body" but is at the back of the "mask of the foot at the front", and thus, the determination result in the step S65 becomes "NO". Accordingly, in the step S69, the eyes Ey are not depicted at a part overlapped with the mask of the foot at the front FMs and are depicted at only a part not overlapped with this. The line of "the line of the foot at the front" selected at a sixth time is in front of any of the "mask of the foot at the front", the "eyes", the "line of the body", the "mask of the body" and the "line of the foot at the back", and thus, the determination result in the step S65 becomes "YES". Accordingly, in the step S67, the whole foot at the front Ft1 is depicted.

Thus, the player character PCr as shown in FIG. 16(B) is consequently depicted on the background Bg depicted in the VRAM 42d in the preceding step S17. In this case, both of the mask of the body BMs and the mask of the foot at the front FMs are transparent, and therefore, the background Bg is visible through the body Bd and the foot at the front Ft1 (see FIG. 9).

As understood from the above description, in this embodiment, the CPU 40 of the game apparatus 12 generates control point data (76a) in relation to the control point CP for forming a contour (Ed) of each part of the player character PCr (S3-S9), generates a line model Bd of the body being the line polygon model along the contour of the body of the player character PCr on the basis of the control point data (S11a), generates a foot line model Ft2 which is a line polygon model along the contour of one foot of the player character PCr, and is arranged at the back of the line model of the body Bd in the Z axis direction (S11b), and generates a mask of the body BMs which is a transparent polygon model arranged at the back of the line model of the body Bd in the Z axis direction and in front of the line model of the foot Ft2 in the Z axis direction, and having the contour along the line of the body (S13a). Then, when the respective models are depicted by performing a Z comparison (S19) after the background Bg is depicted (S17), the mask of the body BMs is first depicted, the line model of the foot Ft2 is depicted after the mask of the body BMs, and the line model of the body Bd is depicted after the line model of the foot Ft2 (see FIG. 21(B)).

The control point data is thus generated, and generates a line polygon model along the contour of each part of the player character PCr on the basis it, and therefore, it is possible to generates the player character PCr having a complex shape and making various movements by the control point data.

Furthermore, the mask of the body BMs is first depicted after depicting the background when such a player character PCr is depicted, and whereby, both of the line model of the body Bd and the line model of the foot Ft2 undergo the Z comparison with the mask of the body BMs. The line model of the body Bd is in front of the mask of the body BMs in the Z direction, and thus depicted without undergoing the mask by the mask of the body BMs. On the other hand, the line model of the foot Ft2 is at the back of the mask of the body Bd in the Z direction, and thus masked at a part overlapped with the mask of the body BMs, and depicted only at a part not overlapped with the mask of the body BMs. Furthermore, the mask of the body BMs is transparent, and has no effect on visibility of the background. Accordingly, through the inside of the first line model (part encircled by the first line model), the background Bg is visible, but the line model of the foot Ft2 is made invisible. Thus, it is possible to depict the character object without losing the feature of the line drawing, such as transparency of the background and without uncomfortable feeling.

Here, in a case that in addition to player character PCr, another object arranged at the back of it in the Z direction, for example, the enemy character object OCr is further depicted, by depicting this enemy character OCr in front of mask of the body BMs, this enemy character OCr is visible through the inside of the line model of the body Bd (see FIG. 26(A)).

Additionally, the CPU 40 further generates the line model of the foot Ft1 being a line polygon model along a contour of the other foot of the player character PCr, and arranged in front of the line model of the body Bd in the Z direction on the basis of the control point data (S11c), and generates the mask of the foot FMs being a transparent polygon model arranged in front of the line model of the body Bd in the Z direction and at the back of the line model of the foot Ft1 in the Z direction, and having a contour along the foot at the front (S13c). When model depicting is performed, the mask of the foot FMs is depicted after the mask of the body BMs and before the line model of the foot Ft2, and the line model of the foot Ft1 is depicted after the line model of the body Bd (see FIG. 21(B)).

Thus, after depicting the background, the mask of the body BMs is first depicted, and the mask of the foot FMs is next depicted, and whereby, the line model of the body Bd, the line model of the foot Ft2 and the line model of foot Ft1 undergo a Z comparison with the mask of the body BMs and moreover the mask of the foot FMs. Here, when the mask of the foot FMs is depicted before the mask of the body BMs, a loss may be occur in the mask of the body BMs due to the Z comparison, and this is not preferable.

The line model of the body Bd is arranged in front of the mask of the body BMs in the Z direction, and thus, it doe not undergo the mask by the mask of the body BMs, but the line model of the body Bd is arranged at the back of the mask of the foot FMs in the Z direction, and thus, it is masked at a part overlapped with the mask of the foot FMs and depicted only at a part not overlapped with the mask of the foot FMs. The line model of the foot Ft2 are at the back of both of the mask of the body BMs and the mask of the foot FMs in the Z direction, and thus, it is masked at a part overlapped with the mask of the body BMs and/or the mask of the foot FMs, and depicted at a part not overlapped with both of the mask of the body BMs and the mask of the foot FMs. The line model of the foot Ft1 is in front of both of the mask of the body BMs and the mask of the foot FMs in the Z direction, and thus it is depicted without undergoing any mask by the mask of the body BMs and the mask of the foot FMs. In addition, since the mask of the foot FMs is transparent similar to the mask of the body BMs, it has no effect on visibility of the background.

Accordingly, through the inside of the line model of the body Bd and/or the line model of the foot Ft1 (part encircled by the line model of the body Bd and/or the line model of the foot Ft1), the background is visible, but the line model of the foot Ft2 is invisible.

Generally, the CPU 40 generates Z data for depicting indicating an alignment in the Z direction of the respective line models (76*f*) (S14), further generates z-sorting data (76*g*) indicating a depicting order of the respective line models (S15), and depicts the respective line models with reference to the Z-array information and the Z-sorting information. That is, after depicting the background, each mask (BMs, FMs1, . . . ) is depicted faster than the line model to be masked out of the respective line models (Bd, Ft1, Ft2, . . . ), so that all the line models to be masked undergo a Z comparison with each mask (BMs, FMs1, . . . ). The depicting order between the masks (BMs, FMs1, . . . ) is according to the Z-array information (76*f*), and therefore, a loss does not occur in any masks (BMs, FMs1, . . . ). The line model in front of each mask in the Z direction is depicted without undergoing the mask by any masks. On the other hand, the line model at the back of each mask in the Z direction is masked at a part overlapped with at least one mask, and depicted only at a part not overlapped with any masks.

Then, each mask model is transparent and thus has no effect on visibility of the background Bg. Accordingly, through the inside of each line model (part encircled by each line model), the background Bg is made visible, but each line at the back of the line model in the Z direction is invisible. It is possible to depict the characters such as the player character PCr and the enemy character OCr and objects other than the characters without losing the feature of the line drawing, such as transparency of the background and without uncomfortable feeling.

In the above description, the game system 10 is explained, but the invention can be applied to a game apparatus and a game system which display a character object within a three-dimensional virtual space. The each processing executed by the game apparatus may be distributedly executed by a plurality of computers, etc. in the game system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus displaying a character object within a three-dimensional virtual space, comprising:
   a contour information generator which generates contour information for forming a contour of each part of said character object;
   a first line model generator which generates a first line model being a line polygon model along a contour of a first part of said character object on the basis of said contour information;
   a second line model generator which generates a second line model being a line polygon model along a contour of a second part of said character object, and arranged at a back of said first line model in a Z direction on the basis of said contour information;
   a first mask model generator which generates a first mask model being a transparent polygon model that is arranged at the back of said first line model in the Z direction and in front of said second line model in the Z direction, and having the contour along said first part on the basis of said contour information;
   a background depicter which depicts a background;
   a Z-array information generator which generates Z-array information indicating an alignment of said respective line models;
   a Z-sorting information generator which generates Z-sorting information indicating a depicting order of said respective line models; and
   a model depicting processor which depicts the respective models with a Z comparison performed after depicting by said background depicter, wherein
   said model depicting processor
      first depicts said first mask model,
      depicts said second line model after said first mask model,
      depicts said first line model after said second line model, and
      depicts each line segment in an order according to said Z-sorting information with a Z comparison based on said Z-array information performed.

2. A game apparatus according to claim 1, further comprising:
   a third line model generator which generates a third line model being a line polygon model along a contour of a third part of said character object, and being arranged in front of said first line model in the Z direction on the basis of said contour information, and
   a second mask model generator which generates a second mask model being a transparent polygon model that is arranged in front of said first line model in the Z direction and at a back of said third line model in the Z direction, and having the contour along said third part on the basis of said contour information, wherein
   said model depicting processor further
      depicts said second mask model after said first mask model and before said second line model, and
      depicts said third line model after said first line model.

3. A game apparatus according to claim 1, wherein said contour information includes coordinate information of respective points along said contour.

4. A game apparatus according to claim 3, further comprising:
   an acceptor which accepts an input from an operating device; and
   a game processor which repetitively executes game processing including an animation control with respect to said character object in response to the input accepted by said acceptor and/or on the basis of a predetermined algorithm, wherein
   said contour information generator generates said coordinate information every time that said game processing is executed.

5. A game apparatus according to claim 4, wherein said contour information generator offsets said coordinate information in correspondence with a moving state of said character object by said animation control.

6. A game apparatus according to claim 5, wherein said contour information further includes parameter information indicating a degree of offset in correspondence with said moving state of each point along said contour, and said contour information generator changes an amount of offset of each point on the basis of said parameter information.

7. A game apparatus according to claim 3, wherein
each line model generator generates a line polygon model with a predetermined width along the contour of each part on the basis of said coordinate information.

8. A game apparatus according to claim 7, wherein
each line model generator
evaluates a normal vector with respect to the contour in each point,
assign to each point a line segment in parallel with the normal vector in said point and having said predetermined width, and
generates a series of polygons each having a pair of endpoints of each line segment as shared vertexes.

9. A game apparatus according to claim 8, wherein
said model depicting processor repetitively maps a unit texture by dividing said series of polygons on a predetermined number basis when each of said line models is depicted.

10. A game apparatus according to claim 9, wherein
said unit texture is repetitively mapped to form a knitting pattern.

11. A non-transitory storage medium storing a game program, said game program causes a computer of a game apparatus displaying a character object within a three-dimensional virtual space to execute functionality comprising:
a contour information generator which generates contour information for forming a contour of each part of said character object;
a first line model generator which generates a first line model being a line polygon model along a contour of a first part of said character object on the basis of said contour information;
a second line model generator which generates a second line model being a line polygon model along a contour of a second part of said character object and arranged at a back of said first line model in a Z direction on the basis of said contour information;
a first mask model generator which generates a first mask model being a transparent polygon model that is arranged at the back of said first line model in the Z direction and in front of said second line model in the Z direction, and having the contour along said first part on the basis of said contour information;
a background depicter which depicts a background;
a Z-array information generator which generates Z-array information indicating an alignment of said respective line models;
a Z-sorting information generator which generates Z-sorting information indicating a depicting order of said respective line models; and
a model depicting processor which depicts said respective models with a Z comparison performed after depicting by said background depicter, wherein said model depicting processor
first depicts said first mask model,
depicts said second line model after said first mask model,
depicts said first line model after said second line model, and
depicts each line segment in an order according to said Z-sorting information with a Z comparison based on said Z-array information performed.

12. A game system displaying a character object within a three-dimensional virtual space, comprising:
a contour information generator which generates contour information for forming a contour of each part of said character object;
a first line model generator which generates a first line model being a line polygon model along a contour of a first part of said character object on the basis of said contour information;
a second line model generator which generates a second line model being a line polygon model along a contour of a second part of said character object, and arranged at a back of said first line model in a Z direction on the basis of said contour information;
a first mask model generator which generates a first mask model being a transparent polygon model that is arranged at the back of said first line model in the Z direction and in front of said second line model in the Z direction, and having the contour along said first part on the basis of said contour information;
a background depicter which depicts a background;
a Z-array information generator which generates Z-array information indicating an alignment of said respective line models;
a Z-sorting information generator which generates Z-sorting information indicating a depicting order of said respective line models; and
a model depicting processor which depicts said respective models with a Z comparison performed after depicting by said background depicter, wherein said model depicting processor
first depicts said first mask model,
depicts said second line model after said first mask model,
depicts said first line model after said second line model, and
depicts each line segment in an order according to said Z-sorting information with a Z comparison based on said Z-array information performed.

13. A game apparatus displaying a character object within a three-dimensional virtual space, comprising:
a contour information generator which generates contour information for forming a contour of each part of said character object;
a line model generator which generates each line model being a line polygon model along a contour of each part of said character object on the basis of said contour information;
a mask model generator which generates a mask model being a transparent polygon model having, with respect to at least one part of said character object, a contour along the part on the basis of said contour information;
a Z-array information generator which generates Z-array information indicating an alignment in a Z direction of said respective line models;
a Z-sorting information generator which generates Z-sorting information indicating a depicting order of said respective line models;
a background depicter which depicts a background; and
a model depicting processor which depicts said respective models in the order according to said Z-sorting information with a Z comparison based on said Z-sorting information performed after depicting by said background depicter, wherein
said Z-sorting information generator generates such Z-sorting information as to cause said model depicting processor to:

depict each of said mask models before a line model to be masked in the order according to said Z-array information out of said respective line models; and generate Z-sorting information for depicting each of said line models in the order according to said Z-array information after each of said mask models.

14. A method implemented in an information processing apparatus having one or more processors and for displaying a character object within a three-dimensional virtual space, the method comprising:

generating contour information for forming a contour of each part of said character object;

generating a first line model being a line polygon model along a contour of a first part of said character object on the basis of said contour information;

generating a second line model being a line polygon model along a contour of a second part of said character object and arranged at a back of said first line model in a Z direction on the basis of said contour information;

generating a first mask model being a transparent polygon model that is arranged at the back of said first line model in the Z direction and in front of said second line model in the Z direction, and having the contour along said first part on the basis of said contour information;

depicting a background;

generating Z-array information indicating an alignment of said respective line models;

generating Z-sorting information indicating a depicting order of said respective line models; and depicting, via the one or more processors, said respective models with a Z comparison performed after depicting the background, wherein said first mask model is first depicted, said second line model is depicted after said first mask model, said first line model is depicted after said second line model, and each line segment is depicted in an order according to said Z-sorting information with a Z comparison based on said Z-array information performed.

* * * * *